US012034597B2

(12) United States Patent
Guim Bernat et al.

(10) Patent No.: US 12,034,597 B2
(45) Date of Patent: *Jul. 9, 2024

(54) METHODS AND APPARATUS TO CONTROL PROCESSING OF TELEMETRY DATA AT AN EDGE PLATFORM

(71) Applicant: Intel Corporation, Santa Clara, CA (US)

(72) Inventors: Francesc Guim Bernat, Barcelona (ES); Kshitij Doshi, Tempe, AZ (US); Ned Smith, Beaverton, OR (US); Thijs Metsch, Bruehl (DE)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/497,692

(22) Filed: Oct. 8, 2021

(65) Prior Publication Data

US 2022/0247635 A1  Aug. 4, 2022

Related U.S. Application Data

(63) Continuation of application No. 16/723,873, filed on Dec. 20, 2019, now Pat. No. 11,184,236.
(Continued)

(51) Int. Cl.
*G06F 9/46*     (2006.01)
*G06F 1/20*     (2006.01)
(Continued)

(52) U.S. Cl.
CPC .......... *H04L 41/0843* (2013.01); *G06F 1/206* (2013.01); *G06F 9/4881* (2013.01);
(Continued)

(58) Field of Classification Search
CPC ...... G06F 1/206; G06F 9/4881; G06F 9/5094; G06F 2209/5021
See application file for complete search history.

(56) References Cited

U.S. PATENT DOCUMENTS 3,226,675 A   12/1965   Edwards
5,826,239 A   10/1998   Du et al.
(Continued)

FOREIGN PATENT DOCUMENTS

CN   1319800 A   10/2001
CN   1267421 A    9/2009
(Continued)

OTHER PUBLICATIONS

Gezer et al., "An Introduction to Edge Computing and a Real-Time Capable Server Architecture," International Journal of Intelligent Systems, Jul. 17, 2018, 11 pages.
(Continued)

*Primary Examiner* — Diem K Cao
(74) *Attorney, Agent, or Firm* — Hanley, Flight & Zimmerman, LLC

(57) ABSTRACT

Methods, apparatus, systems and articles of manufacture are disclosed to control processing of telemetry data at an edge platform. An example apparatus includes an orchestrator interface to, responsive to an amount of resources allocated to an orchestrator to orchestrate a workload at the edge platform meeting a first threshold, transmit telemetry data associated with the orchestrator to a computer to obtain a first orchestration result at a first granularity; a resource management controller to determine a second orchestration result at a second granularity to orchestrate the workload at the edge platform, the second granularity finer than the first
(Continued)

granularity; and a scheduler to schedule a workload assigned to the edge platform based on the second orchestration result.

20 Claims, 10 Drawing Sheets

Related U.S. Application Data

(60) Provisional application No. 62/939,303, filed on Nov. 22, 2019, provisional application No. 62/907,597, filed on Sep. 28, 2019, provisional application No. 62/841,042, filed on Apr. 30, 2019.

(51) Int. Cl.

| | | |
|---|---|---|
| *G06F 9/48* | (2006.01) | |
| *G06F 9/50* | (2006.01) | |
| *G06F 9/54* | (2006.01) | |
| *G06F 11/30* | (2006.01) | |
| *H04L 9/06* | (2006.01) | |
| *H04L 9/32* | (2006.01) | |
| *H04L 41/084* | (2022.01) | |
| *H04L 41/0869* | (2022.01) | |
| *H04L 41/5054* | (2022.01) | |
| *H04L 47/78* | (2022.01) | |
| *H04L 49/00* | (2022.01) | |
| *H04L 67/10* | (2022.01) | |
| *H04W 4/08* | (2009.01) | |
| *H04W 12/04* | (2021.01) | |

(52) U.S. Cl.
CPC ............ *G06F 9/505* (2013.01); *G06F 9/5094* (2013.01); *G06F 9/542* (2013.01); *G06F 11/3006* (2013.01); *H04L 9/0637* (2013.01); *H04L 9/3213* (2013.01); *H04L 9/3247* (2013.01); *H04L 41/0869* (2013.01); *H04L 41/5054* (2013.01); *H04L 47/781* (2013.01); *H04L 49/70* (2013.01); *H04L 67/10* (2013.01); *H04W 4/08* (2013.01); *H04W 12/04* (2013.01); *G06F 2209/5021* (2013.01)

(56) References Cited

U.S. PATENT DOCUMENTS

| | | |
|---|---|---|
| 5,941,947 A | 8/1999 | Brown et al. |
| 6,038,625 A | 3/2000 | Ogino et al. |
| 6,160,796 A | 12/2000 | Zou |
| 6,185,491 B1 | 2/2001 | Gray et al. |
| 6,363,417 B1 | 3/2002 | Howard et al. |
| 6,363,434 B1 | 3/2002 | Eytchison |
| 6,377,860 B1 | 4/2002 | Gray et al. |
| 6,437,692 B1 | 8/2002 | Petite et al. |
| 6,452,935 B1 | 9/2002 | Gibbs |
| 6,460,082 B1 | 10/2002 | Lumelsky et al. |
| 6,542,474 B1 | 4/2003 | Lau |
| 6,571,297 B1 | 5/2003 | Cline et al. |
| 6,580,950 B1 | 6/2003 | Johnson et al. |
| 6,618,764 B1 | 9/2003 | Shteyn |
| 6,626,607 B1 | 9/2003 | Hiramatsu et al. |
| 6,636,505 B1 | 10/2003 | Wang et al. |
| 6,735,630 B1 | 5/2004 | Gelvin et al. |
| 6,826,607 B1 | 11/2004 | Gelvin et al. |
| 6,832,251 B1 | 12/2004 | Gelvin et al. |
| 6,859,831 B1 | 2/2005 | Gelvin et al. |
| 6,889,188 B2 | 5/2005 | Metzler et al. |
| 6,892,230 B1 | 5/2005 | Gu et al. |
| 6,916,247 B2 | 7/2005 | Gatto et al. |
| 6,948,168 B1 | 9/2005 | Kuprionas |
| 6,961,941 B1 | 11/2005 | Nelson et al. |
| 6,963,784 B1 | 11/2005 | Gibbs |
| 6,973,473 B1 | 12/2005 | Novaes et al. |
| 6,985,939 B2 | 1/2006 | Fletcher et al. |
| 6,990,379 B2 | 1/2006 | Gonzales et al. |
| 7,020,701 B1 | 3/2006 | Gelvin et al. |
| 7,039,701 B2 | 5/2006 | Wesley |
| 7,069,318 B2 | 6/2006 | Burbeck et al. |
| 7,072,960 B2 | 7/2006 | Graupner et al. |
| 7,143,139 B2 | 11/2006 | Burbeck et al. |
| 7,159,007 B2 | 1/2007 | Stawikowski |
| 7,167,920 B2 | 1/2007 | Traversat et al. |
| 7,171,471 B1 | 1/2007 | Nair |
| 7,177,929 B2 | 2/2007 | Burbeck et al. |
| 7,181,536 B2 | 2/2007 | Burbeck et al. |
| 7,185,342 B1 | 2/2007 | Carrer et al. |
| 7,206,934 B2 | 4/2007 | Pabla et al. |
| 7,207,041 B2 | 4/2007 | Elson et al. |
| 7,251,689 B2 | 7/2007 | Wesley |
| 7,263,560 B2 | 8/2007 | Abdelaziz et al. |
| 7,283,811 B2 | 10/2007 | Gidron et al. |
| 7,325,047 B2 | 1/2008 | Brittenham et al. |
| 7,343,428 B2 | 3/2008 | Fletcher et al. |
| 7,386,860 B2 | 6/2008 | Dani et al. |
| 7,412,538 B1 | 8/2008 | Eytchison et al. |
| 7,426,730 B2 | 9/2008 | Mathews et al. |
| 7,472,349 B1 | 12/2008 | Srivastava et al. |
| 7,519,918 B2 | 4/2009 | Trantow |
| 7,599,827 B2 | 10/2009 | Hardwick et al. |
| 7,603,469 B2 | 10/2009 | Fletcher et al. |
| 7,797,367 B1 | 9/2010 | Gelvin et al. |
| 7,822,860 B2 | 10/2010 | Brown et al. |
| 7,844,687 B1 | 11/2010 | Gelvin et al. |
| 7,933,945 B2 | 4/2011 | Krzyzanowski et al. |
| 8,140,658 B1 | 3/2012 | Gelvin et al. |
| 8,356,067 B2 | 1/2013 | Trantow |
| 10,110,495 B1 | 10/2018 | Sabella et al. |
| 10,440,096 B2 | 10/2019 | Sabella et al. |
| 11,184,236 B2 | 11/2021 | Guim Bernat et al. |
| 11,249,810 B2 * | 2/2022 | Gabrielson ............ G06F 9/5038 |
| 2002/0062417 A1 | 5/2002 | Rudland et al. |
| 2002/0078259 A1 | 6/2002 | Wendorf et al. |
| 2002/0083143 A1 | 6/2002 | Cheng |
| 2002/0112058 A1 | 8/2002 | Weisman et al. |
| 2002/0143819 A1 | 10/2002 | Han et al. |
| 2003/0005090 A1 | 1/2003 | Sullivan, Jr. et al. |
| 2003/0005130 A1 | 1/2003 | Cheng |
| 2003/0036917 A1 | 2/2003 | Hite et al. |
| 2003/0055624 A1 | 3/2003 | Fletcher et al. |
| 2003/0061256 A1 | 3/2003 | Mathews et al. |
| 2003/0065756 A1 | 4/2003 | Carrez |
| 2003/0084156 A1 | 5/2003 | Graupner et al. |
| 2003/0110334 A1 | 6/2003 | Lanigan et al. |
| 2003/0163513 A1 | 8/2003 | Schaeck et al. |
| 2003/0182394 A1 | 9/2003 | Ryngler et al. |
| 2003/0191802 A1 | 10/2003 | Zhao et al. |
| 2003/0217139 A1 | 11/2003 | Burbeck et al. |
| 2003/0229900 A1 | 12/2003 | Reisman |
| 2004/0003033 A1 | 1/2004 | Kamen et al. |
| 2004/0030740 A1 | 2/2004 | Stelting |
| 2004/0221001 A1 | 11/2004 | Anagol-Subbarao et al. |
| 2004/0268407 A1 | 12/2004 | Sparrell et al. |
| 2005/0108354 A1 | 5/2005 | Lisitsa et al. |
| 2013/0212212 A1 | 8/2013 | Addepalli et al. |
| 2013/0318538 A1* | 11/2013 | Verma .................. G06F 9/50 718/104 |
| 2015/0127733 A1 | 5/2015 | Ding et al. |
| 2016/0085594 A1 | 3/2016 | Wang et al. |
| 2017/0277531 A1 | 9/2017 | McGrath et al. |
| 2018/0024860 A1* | 1/2018 | Balle .................... G06F 9/5027 718/104 |
| 2018/0183855 A1 | 6/2018 | Sabella et al. |
| 2019/0044886 A1 | 2/2019 | Bernat et al. |
| 2019/0243685 A1 | 8/2019 | Guim Bernat et al. |
| 2020/0151023 A1* | 5/2020 | Bai .................... H04L 41/0893 |
| 2020/0167205 A1 | 5/2020 | Guim Bernat et al. |

FOREIGN PATENT DOCUMENTS

| | | | | |
|---|---|---|---|---|
| CN | 105262623 A | * | 1/2016 | ......... H04L 41/0893 |
| CN | 106936883 A | * | 7/2017 | ............. H04L 47/70 |

(56) References Cited

FOREIGN PATENT DOCUMENTS

| CN | 108090708 A | * | 5/2018 | ....... G06Q 10/06311 |
|---|---|---|---|---|
| DE | 102020203877 A1 | | 11/2020 | |
| WO | 98/59478 | | 12/1998 | |
| WO | 2013/123445 A1 | | 8/2013 | |

OTHER PUBLICATIONS

Liu et al., "Software-Defined Edge Cloud Framework for Resilient Multitenant Applications," Wireless Communication and Mobile Computing, vol. 2019, Jan. 1, 2019, 18 pages.

Caraguay et al., "Monitoring and Discovery for Self-Organized Network Management in Virtualized and Software Defined Networks," Sensors (Basel, Switzerland) vol. 17, 731, Mar. 31, 2017, 31 pages.

Yousefpour et al., "All One Needs to Know about Fog Computing and Related Edge Computing Paradigms: A Complete Survey," Journal of Systems Architecture, Aug. 15, 2018, 49 pages.

Hong et al., "Resource Management in Fog/Edge Computing: A Survey," ACM Computing Surveys 52.5 (2019), Sep. 30, 2018, 22 pages.

Jayaraman et al., "Orchestrating Quality of Service in the Cloud of Things Ecosystem," 2015 IEEE International Symposium on Nanoelectronic and Information Systems, Indore, Presented Dec. 21-23, 2015, pp. 185-190, 6 pages.

European Patent Office, "Communication under Rule 94(3) EPC," issued in connection with European Patent Application No. 16908283.1, dated Apr. 14, 2020, 5 pages.

State Intellectual Property Office of the People's Republic of China, "Notification to Grant Patent Right for Invention," issued in connection with Chinese Patent Application No. 03159735.1, dated Apr. 27, 2011, 4 pages.

State Intellectual Property Office of the People's Republic of China, "Third Office Action," Issued in connection with Chinese Patent Application No. 03159735.1, dated Mar. 14, 2008, 10 pages.

State Intellectual Property Office of the People's Republic of China, "Decision on Rejection," Issued in connection with Chinese Patent Application No. 03159735.1, dated Mar. 27, 2009, 5 pages.

United States Patent and Trademark Office, "Non-Final Office Action," issued in connection with U.S. Appl. No. 14/594,752, dated Apr. 6, 2021, 32 pages.

United States Patent and Trademark Office, "Non-Final Office Action," issued in connection with U.S. Appl. No. 14/594,752, dated Oct. 3, 2019, 33 pages.

United States Patent and Trademark Office, "Non-Final Office Action," issued in connection with U.S. Appl. No. 14/594,752, dated Oct. 6, 2017, 49 pages.

United States Patent and Trademark Office, "Final Office Action," issued in connection with U.S. Appl. No. 14/594,752, dated Jun. 15, 2020, 36 pages.

United States Patent and Trademark Office, "Advisory Action," issued in connection with U.S. Appl. No. 14/594,752, dated Oct. 28, 2020, 3 pages.

State Intellectual Property Office of the People's Republic of China, "First Office Action," issued in connection with Chinese Patent Application No. 03159735.1, dated Sep. 30, 2005, 9 pages.

State Intellectual Property Office of the People's Republic of China, "Second Office Action," Issued in connection with Chinese Patent Application No. 03159735.1, dated Jul. 11, 2007, 7 pages.

United States Patent and Trademark Office, "Notice of Allowance," issued in connection with U.S. Appl. No. 16/723,873, dated Jul. 7, 2021, 11 pages.

United States Patent and Trademark Office, "Final Office Action," issued in connection with U.S. Appl. No. 14/594,752, dated Sep. 6, 2018, 37 pages.

United States Patent and Trademark Office, "Final Office Action," issued in connection with U.S. Appl. No. 14/594,752, dated Dec. 13, 2021, 29 pages.

European Patent Office, "Extended European Search Report," issued in connection with European Patent Application No. 16908283.1, dated Nov. 12, 2019, 8 pages.

European Patent Office, "Communication Pursuant to Article 94(3) EPC," issued in connection with European Patent Application No. 16908283.1, dated Feb. 22, 2021, 5 pages.

United States Patent and Trademark Office, "Notice of Allowance and Fee(s) Due," issued in connection with U.S. Appl. No. 14/594,752, dated Dec. 22, 2022, 8 pages.

United States Patent and Trademark Office, "Notice of Allowability," issued in connection with U.S. Appl. No. 14/594,752, dated Jan. 10, 2023, 2 pages.

* cited by examiner

METHODS AND APPARATUS TO CONTROL PROCESSING OF TELEMETRY DATA AT AN EDGE PLATFORM

RELATED APPLICATION

This patent arises from a continuation of U.S. patent application Ser. No. 16/723,873, (now U.S. Pat. No. 11,184, 236) which was filed on Dec. 20, 2019. U.S. patent application Ser. No. 16/723,873 claims benefit of U.S. Provisional Patent Application Ser. No. 62/841,042, which was filed on Apr. 30, 2019; U.S. Provisional Patent Application Ser. No. 62/907,597, which was filed on Sep. 28, 2019; and U.S. Provisional Patent Application Ser. No. 62/939,303, which was filed on Nov. 22, 2019. U.S. patent application Ser. No. 16/723,873; U.S. Provisional Patent Application Ser. No. 62/841,042; U.S. Provisional Patent Application Ser. No. 62/907,597; and U.S. Provisional Patent Application Ser. No. 62/939,303 are hereby incorporated herein by reference in their entirety. Priority to U.S. patent application Ser. No. 16/723,873; U.S. Provisional Patent Application Ser. No. 62/841,042; U.S. Provisional Patent Application Ser. No. 62/907,597; and U.S. Provisional Patent Application Ser. No. 62/939,303 is hereby claimed.

FIELD OF THE DISCLOSURE

This disclosure relates generally to edge environments, and, more particularly, to methods and apparatus to control processing of telemetry data at an edge platform.

BACKGROUND

Edge environments (e.g., an Edge, Fog, multi-access edge computing (MEC), or Internet of Things (IoT) network) enable workload execution (e.g., execution of one or more computing tasks, execution of a machine learning model using input data, etc.) near endpoint devices that request an execution of the workload. Edge environments may include infrastructure, such as an edge platform, that is connected to cloud infrastructure, endpoint devices, and/or additional edge infrastructure via networks such as the Internet. Edge platforms may be closer in proximity to endpoint devices than cloud infrastructure, such as centralized servers.

Figure 1:
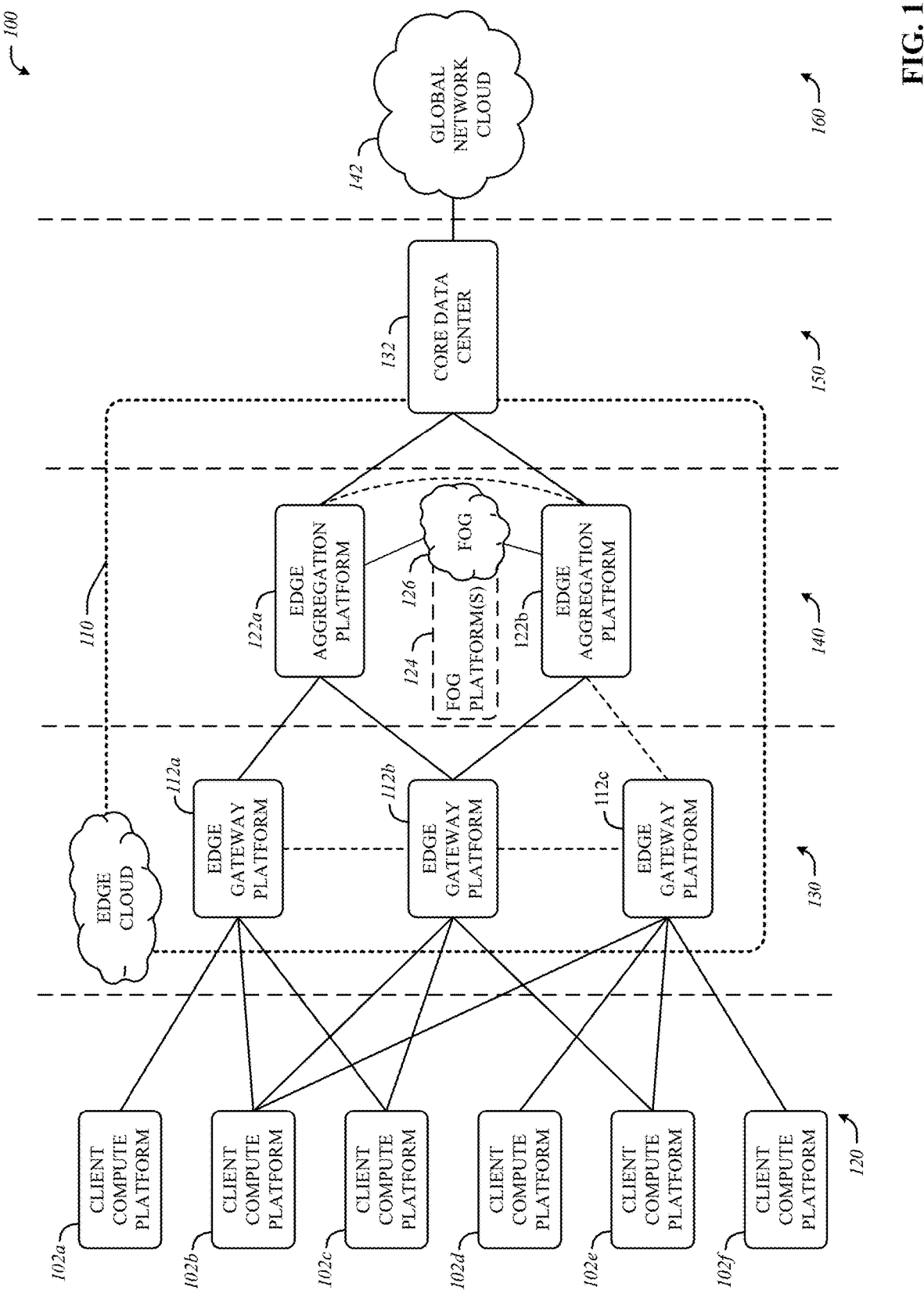
FIG. 1 depicts an example edge computing system for providing edge services and applications to multi-stakeholder entities, as distributed among one or more client compute platforms, one or more edge gateway platforms, one or more edge aggregation platforms, one or more core data centers, and a global network cloud, as distributed across layers of the edge computing system.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Edge computing, at a general level, refers to the transition of compute and storage resources closer to endpoint devices (e.g., consumer computing devices, user equipment, etc.) in order to optimize total cost of ownership, reduce application latency, improve service capabilities, and improve compliance with data privacy or security requirements. Edge computing may, in some scenarios, provide a cloud-like distributed service that offers orchestration and management for applications among many types of storage and compute resources. As a result, some implementations of edge computing have been referred to as the "edge cloud" or the "fog," as powerful computing resources previously available only in large remote data centers are moved closer to endpoints and made available for use by consumers at the "edge" of the network.

Edge computing use cases in mobile network settings have been developed for integration with multi-access edge computing (MEC) approaches, also known as "mobile edge computing." MEC approaches are designed to allow application developers and content providers to access computing capabilities and an information technology (IT) service environment in dynamic mobile network settings at the edge of the network. Limited standards have been developed by the European Telecommunications Standards Institute (ETSI) industry specification group (ISG) in an attempt to define common interfaces for operation of MEC systems, platforms, hosts, services, and applications.

Edge computing, MEC, and related technologies attempt to provide reduced latency, increased responsiveness, and more available computing power than offered in traditional cloud network services and wide area network connections. However, the integration of mobility and dynamically launched services to some mobile use and device processing use cases has led to limitations and concerns with orchestration, functional coordination, and resource management, especially in complex mobility settings where many participants (e.g., devices, hosts, tenants, service providers, operators, etc.) are involved.

In a similar manner, Internet of Things (IoT) networks and devices are designed to offer a distributed compute arrangement from a variety of endpoints. IoT devices can be physical or virtualized objects that may communicate on a network, and can include sensors, actuators, and other input/output components, which may be used to collect data or perform actions in a real-world environment. For example, IoT devices can include low-powered endpoint devices that are embedded or attached to everyday things, such as buildings, vehicles, packages, etc., to provide an additional level of artificial sensory perception of those things. In recent years, IoT devices have become more popular and thus applications using these devices have proliferated.

In some examples, an edge environment can include an enterprise edge in which communication with and/or communication within the enterprise edge can be facilitated via wireless and/or wired connectivity. The deployment of various Edge, Fog, MEC, and IoT networks, devices, and services have introduced a number of advanced use cases and scenarios occurring at and towards the edge of the network. However, these advanced use cases have also introduced a number of corresponding technical challenges relating to security, processing and network resources, service availability and efficiency, among many other issues. One such challenge is in relation to Edge, Fog, MEC, and IoT networks, devices, and services executing workloads on behalf of endpoint devices.

The present techniques and configurations may be utilized in connection with many aspects of current networking systems, but are provided with reference to Edge Cloud, IoT, Multi-access Edge Computing (MEC), and other distributed computing deployments. The following systems and techniques may be implemented in, or augment, a variety of distributed, virtualized, or managed edge computing systems. These include environments in which network services are implemented or managed using multi-access edge computing (MEC), fourth generation (4G) or fifth generation (5G) wireless network configurations; or in wired network configurations involving fiber, copper, and other connections. Further, aspects of processing by the respective computing components may involve computational elements which are in geographical proximity of a user equipment or other endpoint locations, such as a smartphone, vehicular communication component, IoT device, etc. Further, the presently disclosed techniques may relate to other Edge/MEC/IoT network communication standards and configurations, and other intermediate processing entities and architectures.

Edge computing is a developing paradigm where computing is performed at or closer to the "edge" of a network, typically through the use of a computing platform implemented at base stations, gateways, network routers, or other devices which are much closer to end point devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with computing hardware that performs virtualized network functions and offers compute resources for the execution of services and consumer functions for connected devices.

Edge environments include networks and/or portions of networks that are located between a cloud environment and an endpoint environment. Edge environments enable computations of workloads at edges of a network. For example, an endpoint device may request a nearby base station to compute a workload rather than a central server in a cloud environment. Edge environments include edge platforms, which include pools of memory, storage resources, and/or processing resources. Edge platforms perform computations, such as an execution of a workload, on behalf of other edge platforms and/or edge nodes. Edge environments facilitate connections between producers (e.g., workload executors, edge platforms) and consumers (e.g., other edge platforms, endpoint devices).

Because edge platforms may be closer in proximity to endpoint devices than centralized servers in cloud environments, edge platforms enable computations of workloads with a lower latency (e.g., response time) than cloud environments. Edge platforms may also enable a localized execution of a workload based on geographic locations or network topographies. For example, an endpoint device may require a workload to be executed in a first geographic area, but a centralized server may be located in a second geographic area. The endpoint device can request a workload execution by an edge platform located in the first geographic area to comply with corporate or regulatory restrictions.

Examples of workloads to be executed in an edge environment include autonomous driving computations, video surveillance monitoring, machine learning model executions, and real time data analytics. Additional examples of workloads include delivering and/or encoding media streams, measuring advertisement impression rates, object detection in media streams, speech analytics, asset and/or inventory management, and augmented reality processing.

Edge platforms enable both the execution of workloads and a return of a result of an executed workload to endpoint devices with a response time lower than the response time of a server in a cloud environment. For example, if an edge platform is located closer to an endpoint device on a network than a cloud server, the edge service may respond to workload execution requests from the endpoint device faster than the cloud server. An endpoint device may request an execution of a time-constrained workload from an edge service rather than a cloud server.

In addition, edge platforms enable the distribution and decentralization of workload executions. For example, an endpoint device may request a first workload execution and a second workload execution. In some examples, a cloud server may respond to both workload execution requests. With an edge environment, however, a first edge platform may execute the first workload execution request, and a second edge platform may execute the second workload execution request.

To meet the low-latency and high-bandwidth demands of endpoint devices, orchestration in edge clouds is performed on the basis of timely information about the utilization of many resources (e.g., hardware resources, software resources, virtual hardware and/or software resources, etc.), and the efficiency with which those resources are able to meet the demands placed on them. Such timely information is generally referred to as telemetry (e.g., telemetry data, telemetry information, etc.).

Telemetry can be generated from a plurality of sources including each hardware component or portion thereof, virtual machines (VMs), operating systems (OSes), applications, and orchestrators. Telemetry can be used by orchestrators, schedulers, etc., to determine a quantity, quantities, and/or type of computation tasks to be scheduled for execution at which resource or portion(s) thereof, and an expected time to completion of such computation tasks based on historical and/or current (e.g., instant or near-instant) telemetry. For example, a core of a multi-core central processing unit (CPU) can generate over a thousand different varieties of information every fraction of a second using a performance monitoring unit (PMU) sampling the core and/or, more generally, the multi-core CPU. Periodically aggregating and processing all such telemetry in a given edge platform, edge node, etc., can be an arduous and cumbersome process. Prioritizing salient features of interest and extracting such salient features from telemetry to identify current or future problems, stressors, etc., associated with a resource is difficult. Furthermore, identifying a different resource to offload workloads from a burdened resource is a complex undertaking.

Some edge environments desire to obtain telemetry data associated with resources executing a variety of functions or services, such as data processing or video analytics functions (e.g., machine vision, image processing for autonomous vehicle, facial recognition detection, visual object detection, etc.). However, many high-throughput workloads, including one or more video analytics functions, may execute for less than a millisecond (or other relatively small time duration). Such edge environments do not have distributed monitoring software or hardware solutions or a combination thereof that are capable of monitoring such highly-granular stateless functions that are executed on a platform (e.g., a resource platform, a hardware platform, a software platform, a virtualized platform, etc.).

Many edge environments include a diversity of components for resource management and orchestration. Most of these employ static orchestration when deciding on placement of services and workload at specific edge platforms and perform service level agreement monitoring of the applications and/or services in an any-cost framework. An any-cost framework includes orchestration components that manage resources and services at an edge platform but do not consider the computational costs associated with the orchestration components. Additionally, an any-cost framework includes orchestration components that are not responsive to the availability of computational resources and power to perform operations associated with those orchestration resources. Thus, many edge environments include orchestration resources that are inelastic and consume resources of an edge platform in a non-proportionate manner with respect to the resources and power that they manage. Additionally, many edge environments do not include orchestration components that can be executed at an accelerator. The any-cost framework of existing components is a vulnerability (e.g., a glass jaw) of most edge environments. Orchestration components in most edge environments focus on optimizing resource utilization(s) of services and/or application executing at an edge platform and meeting application and/or workload service level agreements (SLAs). However, orchestration components in most edge environments do not consider the consumption of resources by orchestration components. While some orchestration components may be frugal in their own computation and telemetry data movement requirements, these frugal operations are inflexible and immovable (e.g., there is no way to orchestrate the orchestrator).

The inflexibility of most orchestration components in edge environments can be addressed by incorporation of general purpose processors and/or accelerators in edge platforms to implement a scalable edge cloud. However, incorporating general purpose processors and/or accelerators in edge platforms to implement a scalable edge cloud can present challenges. For example, edge platforms include physical space constraints as opposed to those platforms in a traditional cloud. Additionally, edge platforms aim to provide low latency and scalable scheduling of solutions when processing tenant requests and/or functions. Other challenges are associated with achieving a high ratio of resource usage for tenant requests and/or functions with respect to resources used for a system software stack. Additionally, managing power usage and/or billing policies at edge platforms presents challenges.

Given power and/or thermal restrictions at edge platforms (e.g., base stations) as opposed to those at more traditional, centralized cloud environments (e.g., central offices), dynamic, intelligent, and per-tenant power management policies at edge platforms can reduce and/or recover capital expenditures and/or operational expenditures associated with an edge architecture. For example, by monetizing all capabilities invested into an edge service provider's edge architecture, the edge provider can recover the capital expenditures and/or operational expenditures associated with the capabilities of the edge architecture. Some edge architectures can be powered by solar and wind energy. When computational resources and/or thermal conditions at an edge platform are powered by variable renewable energies (e.g., solar, wind, hydro, etc.) and/or with limited capacity battery backup, failing to provide accurate power management for services can degrade the reliability of edge platforms. Additionally, some edge architectures can have stable power (e.g., connected to the grid), however, balancing thermal conditions can be challenging in such edge architectures.

While original equipment manufacturers (OEMs) and silicon vendors consider power requirements and/or power supplies of distributed computing environments, many assume datacenter-like, continuously, and stably powered environments with uninterruptable power supplies and generators that are available for support during power outages. Many OEM and silicon vendor designs for edge platforms lack support for operating optimally and flexibly under dynamic power and/or thermal envelopes. Additionally, edge platforms can have different power-performance implications when operating in a traditional computing environment as opposed to operating in an edge environment.

Another challenge in edge environments is limited supply, not only with respect to power, but also with respect to elasticity of edge platforms. In extending traditional, data-center-like cloud practices to hosting of applications in different edge locations, some factors to consider include: how many resources are allocated to each workload (e.g., service, application, etc.) at edge platforms; how and/or where to utilize accelerators to obtain good performance per watt; based on the power, which services to migrate between edge platforms to prevent spikes in power consumption; and how to balance power demand across service level agreements associated with various tenant workloads (e.g., based on policies).

The non-uniform and unpredictable demand that can occur in an edge environment along with the inelastic supply of power and/or other resources in an edge environment causes not only the user/tenant services/applications to consume power and/or other resources, but also the system software stack and edge platform management components that also consume power and hardware. For example, in some edge platforms the software stack and edge platform management components can utilize 30% of a footprint of the overall edge platform).

Examples disclosed herein include methods and apparatus to control processing of telemetry data at an edge platform. Examples disclosed herein consider how telemetry data is processed by the system software stack and edge platform management components (e.g., orchestration components). Examples disclosed herein facilitate the processing of telemetry data at near edge platforms (e.g., geographically distant from an endpoint and/or client device) and/or far edge platforms (e.g., geographically proximate to an endpoint and/or client device). In examples disclosed herein, the selection between near edge platforms and/or far edge platforms to process telemetry data is based on how orchestration components have collected and/or processed telemetry data. Thus, examples disclosed herein dynamically change telemetry data analysis between near edge platforms and far edge platforms. For example, some telemetry data can be processed at a near edge platform and based on the orchestration tasks and/or results determined at the near edge platform, future telemetry data can be processed at a far edge platform.

Examples disclosed herein consider where and how components responsible for orchestration and service level agreement (SLA) management (e.g., orchestration components) are executed. Thus, examples disclosed herein offer a dynamic choice between doing so locally, at a far edge platform with limited resources, or, delegating to a comparatively well-provisioned near edge platform but at some cost in responsiveness and loss of finer-granular control of the orchestration at the far edge platform. Examples disclosed herein include a tiered architecture facilitating the dynamic trade-off between how telemetry data is processed by orchestration components and how and/or where orchestration components are executed. Examples disclosed herein describe how hardware accelerators can implement dynamic management of the orchestration components. Examples disclosed herein include a meta-orchestration of orchestration components, responsive to fluctuating power and thermal conditions.

FIG. 1 depicts an example edge computing system 100 for providing edge services and applications to multi-stakeholder entities, as distributed among one or more client compute platforms 102, one or more edge gateway platforms 112, one or more edge aggregation platforms 122, one or more core data centers 132, and a global network cloud 142, as distributed across layers of the edge computing system 100. The implementation of the edge computing system 100 may be provided at or on behalf of a telecommunication service provider ("telco", or "TSP"), internet-of-things service provider, cloud service provider (CSP), enterprise entity, or any other number of entities. Various implementations and configurations of the edge computing system 100 may be provided dynamically, such as when orchestrated to meet service objectives.

Individual platforms or devices of the edge computing system 100 are located at a particular layer corresponding to layers 120, 130, 140, 150, and 160. For example, the client compute platforms 102a, 102b, 102c, 102d, 102e, 102f are located at an endpoint layer 120, while the edge gateway platforms 112a, 112b, 112c are located at an edge devices layer 130 (local level) of the edge computing system 100. Additionally, the edge aggregation platforms 122a, 122b (and/or fog platform(s) 124, if arranged or operated with or among a fog networking configuration 126) are located at a network access layer 140 (an intermediate level). Fog computing (or "fogging") generally refers to extensions of cloud computing to the edge of an enterprise's network or to the ability to manage transactions across the cloud/edge landscape, typically in a coordinated distributed or multi-node network. Some forms of fog computing provide the deployment of compute, storage, and networking services between end devices and cloud computing data centers, on behalf of the cloud computing locations. Some forms of fog computing also provide the ability to manage the workload/workflow level services, in terms of the overall transaction, by pushing certain workloads to the edge or to the cloud based on the ability to fulfill the overall service level agreement.

Fog computing in many scenarios provides a decentralized architecture and serves as an extension to cloud computing by collaborating with one or more edge node devices, providing the subsequent amount of localized control, configuration and management, and much more for end devices. Furthermore, fog computing provides the ability for edge resources to identify similar resources and collaborate to create an edge-local cloud which can be used solely or in conjunction with cloud computing to complete computing, storage or connectivity related services. Fog computing may also allow the cloud-based services to expand their reach to the edge of a network of devices to offer local and quicker accessibility to edge devices. Thus, some forms of fog computing provide operations that are consistent with edge computing as discussed herein; the edge computing aspects discussed herein are also applicable to fog networks, fogging, and fog configurations. Further, aspects of the edge computing systems discussed herein may be configured as a fog, or aspects of a fog may be integrated into an edge computing architecture.

The core data center 132 is located at a core network layer 150 (a regional or geographically central level), while the global network cloud 142 is located at a cloud data center layer 160 (a national or world-wide layer). The use of "core" is provided as a term for a centralized network location-deeper in the network-which is accessible by multiple edge platforms or components; however, a "core" does not necessarily designate the "center" or the deepest location of the network. Accordingly, the core data center 132 may be located within, at, or near the edge cloud 110. Although an illustrative number of client compute platforms 102a, 102b, 102c, 102d, 102e, 102f; edge gateway platforms 112a, 112b, 112c; edge aggregation platforms 122a, 122b; edge core data centers 132; and global network clouds 142 are shown in FIG. 1, it should be appreciated that the edge computing system 100 may include any number of devices and/or systems at each layer. Devices at any layer can be configured as peer nodes and/or peer platforms to each other and, accordingly, act in a collaborative manner to meet service objectives. For example, in additional or alternative examples, the edge gateway platforms 112a, 112b, 112c can be configured as an edge of edges such that the edge gateway platforms 112a, 112b, 112c communicate via peer to peer connections. In some examples, the edge aggregation platforms 122a, 122b and/or the fog platform(s) 124 can be configured as an edge of edges such that the edge aggregation platforms 122a, 122b and/or the fog platform(s) communicate via peer to peer connections. Additionally, as shown in FIG. 1, the number of components of respective layers 120, 130, 140, 150, and 160 generally increases at each lower level (e.g., when moving closer to endpoints (e.g., client compute platforms 102a, 102b, 102c, 102d, 102e, 1020). As such, one edge gateway platforms 112a, 112b, 112c may service multiple ones of the client compute platforms 102a, 102b, 102c, 102d, 102e, 102f, and one edge aggregation platform (e.g., one of the edge aggregation platforms 122a, 122b) may service multiple ones of the edge gateway platforms 112a, 112b, 112c.

Consistent with the examples provided herein, a client compute platform (e.g., one of the client compute platforms 102a, 102b, 102c, 102d, 102e, 1020 may be implemented as any type of endpoint component, device, appliance, or other thing capable of communicating as a producer or consumer of data. For example, a client compute platform can include a mobile phone, a laptop computer, a desktop computer, a processor platform in an autonomous vehicle, etc. In additional or alternative examples, a client compute platform can include a camera, a sensor, etc. Further, the label "platform," "node," and/or "device" as used in the edge computing system 100 does not necessarily mean that such platform, node, and/or device operates in a client or slave role; rather, any of the platforms, nodes, and/or devices in the edge computing system 100 refer to individual entities, platforms, nodes, devices, and/or subsystems which include discrete and/or connected hardware and/or software configurations to facilitate and/or use the edge cloud 110.

As such, the edge cloud 110 is formed from network components and functional features operated by and within the edge gateway platforms 112a, 112b, 112c and the edge aggregation platforms 122a, 122b of layers 130, 140, respectively. The edge cloud 110 may be implemented as any type of network that provides edge computing and/or storage resources which are proximately located to radio access network (RAN) capable endpoint devices (e.g., mobile computing devices, IoT devices, smart devices, etc.), which are shown in FIG. 1 as the client compute platforms 102a, 102b, 102c, 102d, 102e, 102f In other words, the edge cloud 110 may be envisioned as an "edge" which connects the endpoint devices and traditional network access points that serves as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

In some examples, the edge cloud 110 may form a portion of, or otherwise provide, an ingress point into or across a fog networking configuration 126 (e.g., a network of fog platform(s) 124, not shown in detail), which may be implemented as a system-level horizontal and distributed architecture that distributes resources and services to perform a specific function. For instance, a coordinated and distributed network of fog platform(s) 124 may perform computing, storage, control, or networking aspects in the context of an IoT system arrangement. Other networked, aggregated, and distributed functions may exist in the edge cloud 110 between the core data center 132 and the client endpoints (e.g., client compute platforms 102a, 102b, 102c, 102d, 102e, 1020. Some of these are discussed in the following sections in the context of network functions or service virtualization, including the use of virtual edges and virtual services which are orchestrated for multiple tenants.

As discussed in more detail below, the edge gateway platforms 112a, 112b, 112c and the edge aggregation platforms 122a, 122b cooperate to provide various edge services and security to the client compute platforms 102a, 102b, 102c, 102d, 102e, 102f Furthermore, because a client compute platforms (e.g., one of the client compute platforms 102a, 102b, 102c, 102d, 102e, 1020 may be stationary or mobile, a respective edge gateway platform 112a, 112b, 112c may cooperate with other edge gateway platforms to propagate presently provided edge services, relevant service data, and security as the corresponding client compute platforms 102a, 102b, 102c, 102d, 102e, 102f moves about a region. To do so, the edge gateway platforms 112a, 112b, 112c and/or edge aggregation platforms 122a, 122b may support multiple tenancy and multiple tenant configurations, in which services from (or hosted for) multiple service providers, owners, and multiple consumers may be supported and coordinated across a single or multiple compute devices.

In examples disclosed herein, edge platforms in the edge computing system 100 includes meta-orchestration functionality. For example, edge platforms at the far-edge (e.g., edge platforms closer to edge users, the edge devices layer 130, etc.) can reduce the performance or power consumption of orchestration tasks associated with far-edge platforms so that the execution of orchestration components at far-edge platforms consumes a small fraction of the power and performance available at far-edge platforms.

The orchestrators at various far-edge platforms participate in an end-to-end orchestration architecture. Examples disclosed herein anticipate that the comprehensive operating software framework (such as, open network automation platform (ONAP) or similar platform) will be expanded, or options created within it, so that examples disclosed herein can be compatible with those frameworks. For example, orchestrators at edge platforms implementing examples disclosed herein can interface with ONAP orchestration flows and facilitate edge platform orchestration and telemetry activities. Orchestrators implementing examples disclosed herein act to regulate the orchestration and telemetry activities that are performed at edge platforms, including increasing or decreasing the power and/or resources expended by the local orchestration and telemetry components, delegating orchestration and telemetry processes to a remote computer and/or retrieving orchestration and telemetry processes from the remote computer when power and/or resources are available.

The remote devices described above are situated at alternative locations with respect to those edge platforms that are offloading telemetry and orchestration processes. For example, the remote devices described above can be situated, by contrast, at a near-edge platforms (e.g., the network access layer 140, the core network layer 150, a central office, a mini-datacenter, etc.). By offloading telemetry and/or orchestration processes at a near edge platforms, an orchestrator at a near-edge platform is assured of (comparatively) stable power supply, and sufficient computational resources to facilitate execution of telemetry and/or orchestration processes. An orchestrator (e.g., operating according to a global loop) at a near-edge platform can take delegated telemetry and/or orchestration processes from an orchestrator (e.g., operating according to a local loop) at a far-edge platform. For example, if an orchestrator at a near-edge platform takes delegated telemetry and/or orchestration processes, then at some later time, the orchestrator at the near-edge platform can return the delegated telemetry and/or orchestration processes to an orchestrator at a far-edge platform as conditions change at the far-edge platform (e.g., as power and computational resources at a far-edge platform satisfy a threshold level, as higher levels of power and/or computational resources become available at a far-edge platform, etc.).

A variety of security approaches may be utilized within the architecture of the edge cloud 110. In a multi-stakeholder environment, there can be multiple loadable security modules (LSMs) used to provision policies that enforce the stakeholder's interests including those of tenants. In some examples, other operators, service providers, etc. may have security interests that compete with the tenant's interests. For example, tenants may prefer to receive full services (e.g., provided by an edge platform) for free while service providers would like to get full payment for performing little work or incurring little costs. Enforcement point environments could support multiple LSMs that apply the combination of loaded LSM policies (e.g., where the most constrained effective policy is applied, such as where if any of A, B or C stakeholders restricts access then access is restricted). Within the edge cloud 110, each edge entity can provision LSMs that enforce the Edge entity interests. The cloud entity can provision LSMs that enforce the cloud entity interests. Likewise, the various fog and IoT network entities can provision LSMs that enforce the fog entity's interests.

In these examples, services may be considered from the perspective of a transaction, performed against a set of contracts or ingredients, whether considered at an ingredient level or a human-perceivable level. Thus, a user who has a service agreement with a service provider, expects the service to be delivered under terms of the SLA. Although not discussed in detail, the use of the edge computing techniques discussed herein may play roles during the negotiation of the agreement and the measurement of the fulfillment of the agreement (e.g., to identify what elements are required by the system to conduct a service, how the system responds to service conditions and changes, and the like).

Additionally, in examples disclosed herein, edge platforms and/or orchestration components thereof may consider several factors when orchestrating services and/or applications in an edge environment. These factors can include next-generation central office smart network functions virtualization and service management, improving performance per watt at an edge platform and/or of orchestration components to overcome the limitation of power at edge platforms, reducing power consumption of orchestration components and/or an edge platform, improving hardware utilization to increase management and orchestration efficiency, providing physical and/or end to end security, providing individual tenant quality of service and/or service level agreement satisfaction, improving network equipment-building system compliance level for each use case and tenant business model, pooling acceleration components, and billing and metering policies to improve an edge environment.

A "service" is a broad term often applied to various contexts, but in general, it refers to a relationship between two entities where one entity offers and performs work for the benefit of another. However, the services delivered from one entity to another must be performed with certain guidelines, which ensure trust between the entities and manage the transaction according to the contract terms and conditions set forth at the beginning, during, and end of the service.

An example relationship among services for use in an edge computing system is described below. In scenarios of edge computing, there are several services, and transaction layers in operation and dependent on each other—these services create a "service chain". At the lowest level, ingredients compose systems. These systems and/or resources communicate and collaborate with each other in order to provide a multitude of services to each other as well as other permanent or transient entities around them. In turn, these entities may provide human-consumable services. With this hierarchy, services offered at each tier must be transactionally connected to ensure that the individual component (or sub-entity) providing a service adheres to the contractually agreed to objectives and specifications. Deviations at each layer could result in overall impact to the entire service chain.

One type of service that may be offered in an edge environment hierarchy is Silicon Level Services. For instance, Software Defined Silicon (SDSi)-type hardware provides the ability to ensure low level adherence to transactions, through the ability to intra-scale, manage and assure the delivery of operational service level agreements. Use of SDSi and similar hardware controls provide the capability to associate features and resources within a system to a specific tenant and manage the individual title (rights) to those resources. Use of such features is among one way to dynamically "bring" the compute resources to the workload.

For example, an operational level agreement and/or service level agreement could define "transactional throughput" or "timeliness"—in case of SDSi, the system and/or resource can sign up to guarantee specific service level specifications (SLS) and objectives (SLO) of a service level agreement (SLA). For example, SLOs can correspond to particular key performance indicators (KPIs) (e.g., frames per second, floating point operations per second, latency goals, etc.) of an application (e.g., service, workload, etc.) and an SLA can correspond to a platform level agreement to satisfy a particular SLO (e.g., one gigabyte of memory for 10 frames per second). SDSi hardware also provides the ability for the infrastructure and resource owner to empower the silicon component (e.g., components of a composed system that produce metric telemetry) to access and manage (add/remove) product features and freely scale hardware capabilities and utilization up and down. Furthermore, it provides the ability to provide deterministic feature assignments on a per-tenant basis. It also provides the capability to tie deterministic orchestration and service management to the dynamic (or subscription based) activation of features without the need to interrupt running services, client operations or by resetting or rebooting the system.

At the lowest layer, SDSi can provide services and guarantees to systems to ensure active adherence to contractually agreed-to service level specifications that a single resource has to provide within the system. Additionally, SDSi provides the ability to manage the contractual rights (title), usage and associated financials of one or more tenants on a per component, or even silicon level feature (e.g., SKU features). Silicon level features may be associated with compute, storage or network capabilities, performance, determinism or even features for security, encryption, acceleration, etc. These capabilities ensure not only that the tenant can achieve a specific service level agreement, but also assist with management and data collection, and assure the transaction and the contractual agreement at the lowest manageable component level.

At a higher layer in the services hierarchy, Resource Level Services, includes systems and/or resources which provide (in complete or through composition) the ability to meet workload demands by either acquiring and enabling system level features via SDSi, or through the composition of individually addressable resources (compute, storage and network). At yet a higher layer of the services hierarchy, Workflow Level Services, is horizontal, since service-chains may have workflow level requirements. Workflows describe dependencies between workloads in order to deliver specific service level objectives and requirements to the end-to-end service. These services may include features and functions like high-availability, redundancy, recovery, fault tolerance or load-leveling (we can include lots more in this). Workflow services define dependencies and relationships between resources and systems, describe requirements on associated networks and storage, as well as describe transaction level requirements and associated contracts in order to assure the end-to-end service. Workflow Level Services are usually measured in Service Level Objectives and have mandatory and expected service requirements.

At yet a higher layer of the services hierarchy, Business Functional Services (BFS) are operable, and these services are the different elements of the service which have relationships to each other and provide specific functions for the customer. In the case of Edge computing and within the example of Autonomous Driving, business functions may be composing the service, for instance, of a "timely arrival to an event"—this service would require several business functions to work together and in concert to achieve the goal of the user entity: GPS guidance, RSU (Road Side Unit) awareness of local traffic conditions, Payment history of user entity, Authorization of user entity of resource(s), etc. Furthermore, as these BFS(s) provide services to multiple entities, each BFS manages its own SLA and is aware of its ability to deal with the demand on its own resources (Workload and Workflow). As requirements and demand increases, it communicates the service change requirements to Workflow and resource level service entities, so they can, in-turn provide insights to their ability to fulfill. This step assists the overall transaction and service delivery to the next layer.

At the highest layer of services in the service hierarchy, Business Level Services (BLS), is tied to the capability that is being delivered. At this level, the customer or entity might not care about how the service is composed or what ingredients are used, managed, and/or tracked to provide the service(s). The primary objective of business level services is to attain the goals set by the customer according to the overall contract terms and conditions established between the customer and the provider at the agreed to a financial agreement. BLS(s) are comprised of several Business Functional Services (BFS) and an overall SLA.

This arrangement and other service management features described herein are designed to meet the various requirements of edge computing with its unique and complex resource and service interactions. This service management arrangement is intended to inherently address several of the resource basic services within its framework, instead of through an agent or middleware capability. Services such as: locate, find, address, trace, track, identify, and/or register may be placed immediately in effect as resources appear on the framework, and the manager or owner of the resource domain can use management rules and policies to ensure orderly resource discovery, registration and certification.

Moreover, any number of edge computing architectures described herein may be adapted with service management features. These features may enable a system to be constantly aware and record information about the motion, vector, and/or direction of resources as well as fully describe these features as both telemetry and metadata associated with the devices. These service management features can be used for resource management, billing, and/or metering, as well as an element of security. The same functionality also applies to related resources, where a less intelligent device, like a sensor, might be attached to a more manageable resource, such as an edge gateway. The service management framework is made aware of change of custody or encapsulation for resources. Since nodes and components may be directly accessible or be managed indirectly through a parent or alternative responsible device for a short duration or for its entire lifecycle, this type of structure is relayed to the service framework through its interface and made available to external query mechanisms.

Additionally, this service management framework is always service aware and naturally balances the service delivery requirements with the capability and availability of the resources and the access for the data upload the data analytics systems. If the network transports degrade, fail or change to a higher cost or lower bandwidth function, service policy monitoring functions provide alternative analytics and service delivery mechanisms within the privacy or cost constraints of the user. With these features, the policies can trigger the invocation of analytics and dashboard services at the edge ensuring continuous service availability at reduced fidelity or granularity. Once network transports are re-established, regular data collection, upload and analytics services can resume.

The deployment of a multi-stakeholder edge computing system may be arranged and orchestrated to enable the deployment of multiple services and virtual edge instances, among multiple edge platforms and subsystems, for use by multiple tenants and service providers. In a system example applicable to a cloud service provider (CSP), the deployment of an edge computing system may be provided via an "over-the-top" approach, to introduce edge computing platforms as a supplemental tool to cloud computing. In a contrasting system example applicable to a telecommunications service provider (TSP), the deployment of an edge computing system may be provided via a "network-aggregation" approach, to introduce edge computing platforms at locations in which network accesses (from different types of data access networks) are aggregated. However, these over-the-top and network aggregation approaches may be implemented together in a hybrid or merged approach or configuration.

Figure 2:
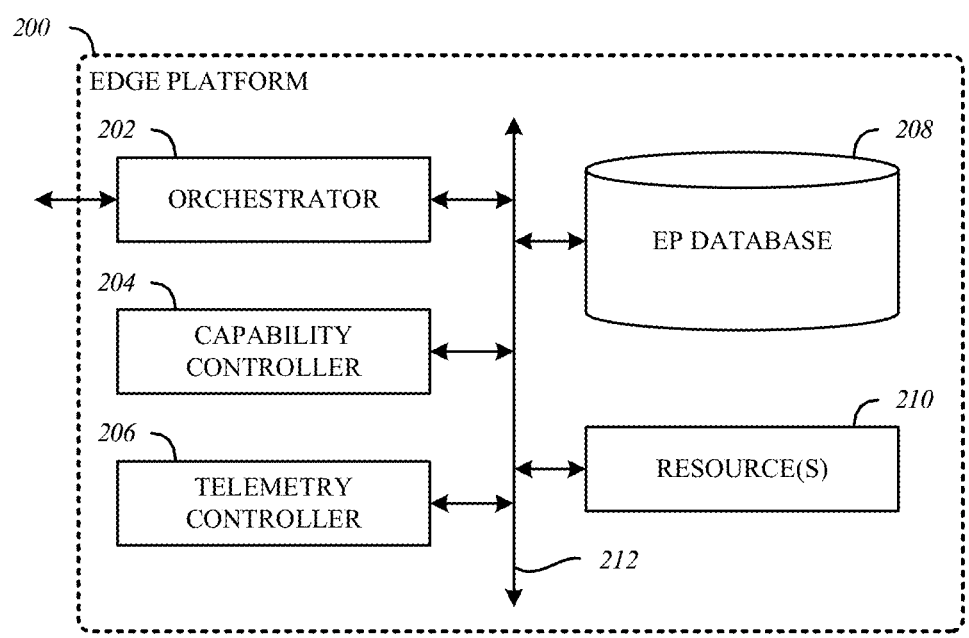
FIG. 2 depicts an example implementation of an edge platform to process workloads received from client compute nodes in accordance with the teachings of this disclosure.

FIG. 2 depicts an example implementation of an edge platform 200 to process workloads received from client compute nodes in accordance with the teachings of this disclosure. For example, any of the edge gateway platforms 112a, 112b, 112c; the edge aggregation platforms 122a, 122b; the fog platform(s) 124; and/or the core data center 132 can be implemented by the edge platform 300. The example edge platform 200 of FIG. 2 includes an example orchestrator 202, an example capability controller 204, an example telemetry controller 206, an example edge platform (EP) database 208, and example resource(s) 210. In the example of FIG. 2, any of the orchestrator 202, the capability controller 204, the telemetry controller 206, the EP database 208, and/or the resource(s) 210 may communicate via an example communication bus 212. In examples disclosed herein, the communication bus 212 may be implemented using any suitable wired and/or wireless communication. In additional or alternative examples, the communication bus 212 includes software, machine readable instructions, and/or communication protocols by which information is communicated among the orchestrator 202, the capability controller 204, the telemetry controller 206, the EP database 208, and/or the resource(s) 210.

In the example illustrated in FIG. 2, the orchestrator 202, the capability controller 204, the telemetry controller 206, the EP database 208, and the resource(s) 210 are included in, correspond to, and/or otherwise is/are representative of the edge platform 200. However, in some examples, one or more of the orchestrator 202, the capability controller 204, the telemetry controller 206, the EP database 208, and the resource(s) 210 can be included in an edge environment including the edge platform 200 (e.g., the edge cloud 110) rather than be included in the edge platform 200. For example, the orchestrator 202 can be connected to an endpoint layer (e.g., the endpoint layer 120), an edge device layer (e.g., the edge device layer 130), a network access layer (e.g., the network access layer 140), a core network layer (e.g., the core network layer 150), and/or a cloud data center layer (e.g., the cloud data center layer 160) while being outside of the edge platform 200.

In other examples, one or more of the orchestrator 202, the capability controller 204, the telemetry controller 206, the EP database 208, and the resource(s) 210 is/are separate devices included in an edge environment. Further, one or more of the orchestrator 202, the capability controller 204, the telemetry controller 206, the EP database 208, and the resource(s) 210 can be included in an edge device layer (e.g., the edge device layer 130), a network access layer (e.g., the network access layer 140), a core network layer (e.g., the core network layer 150), and/or a cloud data center layer (e.g., the cloud data center layer 160). For example, the orchestrator 202 can be included in an edge devices layer (e.g., the edge devices layer 130), or the resource(s) 210 can be included in a network access layer (e.g., the network access layer 140), a core network layer (e.g., the core network layer 150), and/or a cloud data center layer (e.g., the cloud data center layer 160).

In some examples, in response to a request to execute a workload from a client compute platform (e.g., one of the client compute platforms 102a, 102b, 102c, 102d, 102e, 1020, the orchestrator 202 communicates with at least one of the resource(s) 210 and the client compute platform (e.g., one of the client compute platforms 102a, 102b, 102c, 102d, 102e, 1020 to create a contract (e.g., a workload contract) associated with a description of the workload to be executed. The client compute platform (e.g., one of the client compute platforms 102a, 102b, 102c, 102d, 102e, 1020 provides a task associated with the contract and the description of the workload to the orchestrator 202, and the orchestrator 202 schedules the task to be executed at the edge platform. The task can include the contract and the description of the workload to be executed. In some examples, the task includes requests to acquire and/otherwise allocate resources used to execute the workload.

In some examples, the orchestrator 202 maintains records and/or logs of actions occurring in an endpoint layer (e.g., the endpoint layer 120), an edge device layer (e.g., the edge device layer 130), a network access layer (e.g., the network access layer 140), a core network layer (e.g., the core network layer 150), and/or a cloud data center layer (e.g., the cloud data center layer 160) of an edge environment. For example, the resource(s) 210 can notify receipt of a workload description to the orchestrator 202. The orchestrator 202 and/or the resource(s) 210 provide records of actions and/or allocations of resources to the orchestrator 202. For example, the orchestrator 202 maintains and/or stores a record of receiving a request to execute a workload (e.g., a contract request provided by one of the client compute platforms 102a, 102b, 102c, 102d, 102e, 1020.

In some examples, the orchestrator 202 accesses a task and provides and/or assigns the task to one or more of the resource(s) 210 to execute or complete. The resource(s) 210 execute a workload based on a description of the workload included in the task.

In the example of FIG. 2, the orchestrator 202 utilizes a tiered meta-orchestration architecture based on global orchestration and local adaptive orchestration to implement power-thermal aware, dynamically adaptive functionality. The orchestrator 202 is configured to calibrate the power consumption and utilization of the orchestrator 202 (e.g., ones of the resource(s) 210 allocated to the orchestrator 202) and adapt orchestration based on available or predicted power, thermal, and/or resource settings (e.g., budgets). For example, the orchestrator 202 may receive from a client compute platform, with a workload, configuration settings for ones of the resource(s) 210 allocated to the orchestrator 202. The orchestrator 202 is configured to adjust a frequency of monitoring and/or scheduling of monitoring data collections, to manage the consumption of resource(s) 210 by the orchestrator 202 (e.g., orchestration components) to comply with SLA objectives while efficiently orchestrating tasks. For example, the orchestrator 202 can adjust the frequency of monitoring telemetry data based on a priority (e.g., priority level) associated with resources (e.g., the resource(s) 210) at an edge platform (e.g., the edge platform 200). In some examples, the orchestrator 202 can categorize resources at an edge platform into groups. For example, a first group of resources can be top priority where the orchestrator 202 can slightly adjust (e.g., reduces) telemetry monitoring frequency associated with ones of the resources of the first group, a second group can be of middle priority where the orchestrator 202 can adjust (e.g., reduce) telemetry monitoring frequency associated with ones of the resources of the second group, and a third group can be of low priority where the orchestrator 202 can stop telemetry monitoring frequency associated with ones of the resources of the third group.

In the example illustrated in FIG. 2, the orchestrator 202 is configured to adjust the computational effort utilized by (e.g., the computational burden associated with) the orchestrator 202 (e.g., orchestration components) in processing telemetry data. For example, when sufficient ones of the resource(s) 210 are available, the orchestrator 202 can execute more refined analysis, including simulation to improve alignment to service quality objectives. On the other hand, when power and/or the resource(s) 210 are in short supply, the orchestrator 202 can reduce the computational burden associated with orchestration tasks by utilizing a first-cut and/or superficial analysis (e.g., by utilizing a roofline model).

In the example of FIG. 2, when power and/or other ones of the resource(s) 210 meet and/or exceed a first threshold level of resources to allocate to orchestration, the orchestrator 202 can offload orchestration tasks to another computer to obtain coarse-grained orchestration results. In this case, the orchestrator 202 can receive, from the other computer, scheduling actions that describe what operating conditions services and/or workloads assigned to the edge platform 200 might require in the future and/or near future. The coarse-grained orchestration results provide directions to the orchestrator 202 that reduce the computational burden associated with processing orchestration tasks at the orchestrator 202 while allowing the orchestrator 202 to make more fine-grained orchestration decisions at the edge platform 200.

Additionally or alternatively, when power and/or other ones of the resource(s) 210 meet and/or exceed a second threshold level of resources to allocate to orchestration, the orchestrator 202 can offload orchestration tasks to another computer to obtain fine-grained orchestration results. In this example, the orchestrator 202 utilizes hardware accelerators, if available in the resource(s) 210, to reduce the amount of telemetry data to be sent to a remote computer (e.g., by utilizing statistical methods, such as Markov chains) and transmits scheduling tasks to the remote device. For example, the remote device could be an edge platform in the same layer of an edge environment as the edge platform 200 that is at a higher power level than the edge platform 200. In some other examples, the remote device could be an edge platform in a layer of an edge environment that is geographically farther from a client compute platform than the edge platform 200.

In the example of FIG. 2, if the orchestrator 202 receives telemetry data and/or scheduling tasks from a remote device, the orchestrator 202 orchestrates and/or schedules workloads at the remote device at a coarser level than at the remote device (e.g., a "higher order" orchestration). For example, in the event the orchestrator 202 receives telemetry data and/or scheduling tasks from a remote device, the orchestrator 202 may, in general, be very lightweight in power consumption and produce simpler forms of telemetry extraction or orchestration guidance when processing telemetry data and/or scheduling tasks. Additionally, the orchestrator 202 may be in more stable power environments as compared to the remote device that transmitted telemetry data and/or scheduling tasks to the remote device. For example, the remote device could be an edge platform in the same layer of an edge environment as the edge platform 200 that is at a lower power level than the edge platform 200. In additional or alternative examples, the remote device could be an edge platform in a layer of an edge environment that is geographically closer to a client compute platform than the edge platform 200. For example, the remote device (e.g., a global device) can readily obtain delegated orchestration and/or telemetry processing from the edge platform 200 (e.g., a local device) when the edge platform 200 is in a power, thermal, and/or resource state that lends itself to reduced consumption of power, thermal, and/or resources by orchestration components.

In some examples, the example orchestrator 202 implements example means for orchestrating. The orchestrating means may implemented by executable instructions such as those illustrated by at least blocks 402, 404, 406, 408, 410, 412, 414, 416, 418, 420, 422, 424, and 426 of FIG. 4, and/or at least blocks 502, 504, 506, 508, 510, and 512 of FIG. 5, and/or at least blocks 602, 604, 606, 608, 610, 612, 614, 616, and 618 of FIG. 6, and/or at least blocks 702, 704, 706, 708, 710, 712, 714, 714, 716, and 718 of FIG. 7, and/or at least blocks 802, 804, 806, 808, 810, 812, 814, 816, 818, 820, and 822 of FIG. 8, and/or at least blocks 902, 904, 906, 908, 910, 912, 914, 916, 918, 920, 922, and 924 of FIG. 9, which may be executed on at least one processor such as the example processor 1012 shown in the example of FIG. 10. In other examples, the orchestrating means is implemented by hardware logic, hardware implemented state machines, logic circuitry, and/or any other combination of hardware, software, and/or firmware.

Advantageously, an execution of a workload at the edge platform 200 reduces costs (e.g., compute or computation costs, network costs, storage costs, etc., and/or a combination thereof) and/or processing time used to execute the workload. For example, one of the client compute platforms 102a, 102b, 102c, 102d, 102e, 102f can request the edge platform 200 to execute a workload at a first cost lower than a second cost associated with executing the workload in the cloud data center layer 160. In other examples, an endpoint device, such as one of the client compute platforms 102a, 102b, 102c, 102d, 102e, 102f, can be nearer to (e.g., spatially or geographically closer) and/or otherwise proximate to an edge platform, such as the edge platform 200, than a centralized server (e.g., the global network cloud 142) in the cloud data center layer 160. For example, the edge platform 200 is spatially closer to any of the client compute platforms 102a, 102b, 102c, 102d, 102e, 102f than the global network cloud 142. As a result, any of the client compute platforms 102a, 102b, 102c, 102d, 102e, 102f can request the edge platform 200 to execute a workload, and the response time of the edge platform 200 to deliver the executed workload result is lower than that can be provided by the global network cloud 142 in the cloud data center layer 160.

In the illustrated example of FIG. 2, the capability controller 204 determines the capabilities of the edge platform 200 during registration and onboarding of the edge platform 200. For example, the capability controller 204 generates capability data (e.g., hardware resources, storage resources, network resources, software resources, etc. at the edge platform 200). For example, the capability controller 204 can determine the resource(s) 210 allocated to the edge platform 200, such as, hardware resources (e.g., compute, network, security, storage, etc., hardware resources), software resources (e.g., a firewall, a load balancer, a virtual machine (VM), a guest operating system (OS), an application, a hypervisor, etc.), etc., and/or a combination thereof, based on the capability data, from which edge computing workloads (e.g., registered workloads) can be executed. In some examples, the capability controller 204 can determine containers provisioned and/or executing at the edge platform 200. For example, the capability controller 204 can identify micro-services associated with containers provisioned at the edge platform 200 and/or resources allocated to containers at the edge platform 200.

In some examples, the capability controller 204 retrieves the capability data from the EP database 208. For example, when the orchestrator 202 receives a request to execute a workload, the orchestrator 202 identifies, by accessing the capabilities controller 204 and/or the EP database 208, whether the capabilities of the edge platform 200 includes proper resource(s) to fulfill the workload task. For example, if the orchestrator 202 receives a request to execute a workload that requires a processor with two cores, the orchestrator 202 can access the capabilities controller 204 and/or the EP database 208 to determine whether the edge platform 200 includes the capability to process the requested workload.

In the example of FIG. 2, the capability controller 204 additionally determines the capabilities of new and/or additional resources allocated to the edge platform 200. For example, if the edge platform 200 is upgraded by an edge service provider to include additional computational resources, storage resources, and/or network resources, the capabilities controller 204 can register the additional resources and generate capability data associated with the additional resources. In some examples, the capability controller 204 can generate and/or transmit protocols to interface with resources (e.g., the resource(s) 210) at the edge platform 200 to one or more of the orchestrator 202, the telemetry controller 206, and/or the EP database 208.

In the illustrated example of FIG. 2, the telemetry controller 206 improves the distribution and execution of edge computing workloads (e.g., among edge platforms) based on telemetry data associated with edge platforms in an edge computing environment. For example, the telemetry controller 206 can determine that a first edge platform and/or a second edge platform has available one(s) of the resource(s) 210, such as hardware resources (e.g., compute, network, security, storage (e.g., non-volatile memory express), etc., hardware resources), software resources (e.g., a firewall, a load balancer, a virtual machine (VM), a guest operating system (OS), an application, a hypervisor, etc.), etc., and/or a combination thereof, based on telemetry data, from which edge computing workloads can be executed. In such examples, the telemetry data can include a utilization (e.g., a percentage of a resource that is utilized or not utilized), a delay (e.g., an average delay) in receiving a service (e.g., latency), a rate (e.g., an average rate) at which a resource is available (e.g., bandwidth, throughput, etc.), power expenditure, temperatures, etc., associated with one(s) of the resource(s) 210 of at least one of edge platform (e.g., the edge platform 200 and/or an alternative edge platform).

In the illustrated example of FIG. 2, the edge platform 200 include the EP database 208 to record data (e.g., telemetry data, workloads, capability data, etc.). The EP database 208 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The EP database 208 can additionally or alternatively be implemented by double data rate (DDR) memories, such as DDR, DDR2, DDR3, DDR4, mobile DDR (mDDR), etc. The EP database 208 can additionally or alternatively be implemented by one or more mass storage devices such as hard disk drive(s), compact disk drive(s), digital versatile disk drive(s), solid-state disk drive(s), etc. While in the illustrated example the EP database 208 is illustrated as a single database, the EP database 208 can be implemented by any number and/or type(s) of databases. Furthermore, the data stored in the EP database 208 can be in any data format such as, for example, binary data, comma delimited data, tab delimited data, structured query language (SQL) structures, etc.

In the illustrated example of FIG. 2, the resource(s) 210 are invoked to execute a workload (e.g., an edge computing workload) obtained from a client compute platform. For example, the resource(s) 210 can correspond to and/or otherwise be representative of an edge platform or portion(s) thereof. For example, the orchestrator 202, the capability controller 204, the telemetry controller 206, the EP database 208, and/or, more generally, the edge platform 200 can invoke a respective one of the resource(s) 210 to execute one or more edge-computing workloads.

In some examples, the resource(s) 210 are representative of hardware resources, virtualizations of the hardware resources, software resources, virtualizations of the software resources, etc., and/or a combination thereof. For example, the resource(s) 210 can include, correspond to, and/or otherwise be representative of one or more CPUs (e.g., multi-core CPUs), one or more FPGAs, one or more GPUs, one or more network interface cards (NICs), one or more vision processing units (VPUs), etc., and/or any other type of hardware or hardware accelerator. In such examples, the resource(s) 210 can include, correspond to, and/or otherwise be representative of virtualization(s) of the one or more CPUs, the one or more FPGAs, the one or more GPUs, the one more NICs, etc. In other examples, the orchestrator 202, the capability controller 204, the telemetry controller 206, the EP database 208, the resource(s) 210, and/or, more generally, the edge platform 200, can include, correspond to, and/or otherwise be representative of one or more software resources, virtualizations of the software resources, etc., such as hypervisors, load balancers, OSes, VMs, etc., and/or a combination thereof.

Figure 3:
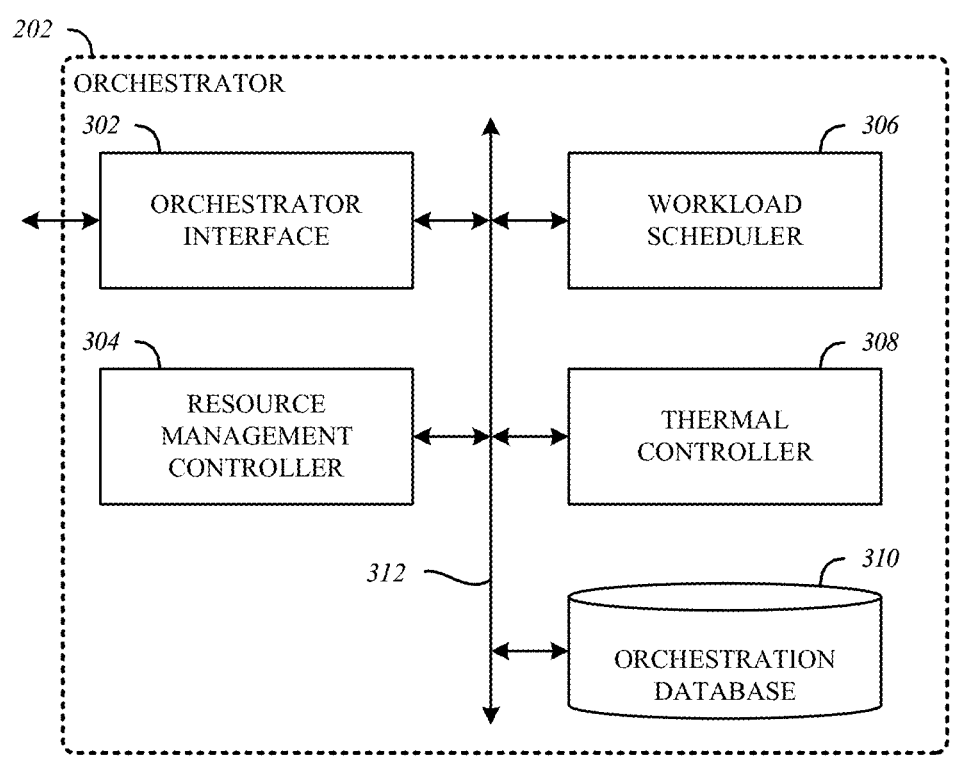
FIG. 3 depicts an example implementation of the orchestrator of FIG. 2 to control processing of telemetry data at an edge platform based on resource availability.

FIG. 3 depicts an example implementation of the orchestrator 202 of FIG. 2 to control processing of telemetry data at an edge platform based on resource availability. The example orchestrator 202 includes an example orchestrator interface 302, an example resource management controller 304, an example workload scheduler 306, an example thermal controller 308, and an example orchestration database 310. In the example of FIG. 3, any of the orchestrator interface 302, the resource management controller 304, the workload scheduler 306, the thermal controller 308, and the orchestration database 310 may communicate via an example communication bus 312. In examples disclosed herein, the communication bus 312 may be implemented using any suitable wired and/or wireless communication. In additional or alternative examples, the communication bus 312 includes software, machine readable instructions, and/or communication protocols by which information is communicated among the orchestrator interface 302, the resource management controller 304, the workload scheduler 306, the thermal controller 308, and/or the orchestrator database 310.

In the example of FIG. 3, the orchestrator 202 facilitates an N-tiered meta-orchestration (e.g., orchestration of orchestration) architecture where N is greater than or equal to two. For example, the orchestrator 202 can function in a local configuration in which the orchestrator 202 orchestrates and/or schedules operations locally at the edge platform 200. In additional or alternative examples, the orchestrator 202 can function in a global configuration in which the orchestrator 202 processes telemetry data from a remote edge platform to orchestrate and/or schedule operations to be executed at the remote edge platform.

In the illustrated example of FIG. 3, the orchestrator 202 includes the orchestrator interface 302. Generally, the orchestrator interface 302 controls communication (e.g., communications related to orchestration) with the edge platform 200 and/or remote edge platforms (e.g., near-edge platforms with respect to the edge platform 200, a next-tier, etc.). Communication between tiers in the meta-orchestration architecture can be facilitated over secure channels when needed, and, may be loosely coupled with orchestrator 202 (e.g., out of band methods and interfaces). For example, the communication channel between meta-orchestration tiers can be encrypted with end to end encryption. In some examples, the secure communication channel can be hierarchical (e.g., by using signed data) such that changes to data transmitted on the secure channel can easily be detected. In additional or alternative examples, the secure channel can be secured using hardware-based security. In some examples, the secure channel can utilize JavaScript Object Notation file formats, web tokens, and/or other file structures that allow for encryption.

The orchestrator interface 302 is configured to determine whether the edge platform 200 has received telemetry data from a remote edge platform. For example, the orchestrator interface 302, and/or more generally, the orchestrator 202, can receive telemetry data from an edge platform that is geographically closer to a client compute platform than the edge platform 200. In response to determining that the edge platform 200 has received telemetry data from a remote edge platform, the orchestrator interface 302 transmits the telemetry data and/or any additional data (e.g., indication of granularity, configuration settings for remote edge platform orchestrator, etc.) to the resource management controller 304.

In the example of FIG. 3, after the resource management controller 304 estimates resources of the remote edge platform to allocate to each workload to meet the workloads respective SLAs, the orchestrator interface 302 determines whether the telemetry data indicates to generate coarse-grained orchestration result or whether the telemetry data indicates to generate fine-grained orchestration results. If the orchestrator interface 302 determines that fine-grained orchestration results have been requested by the orchestrator of the remote edge platform, the orchestrator interface 302 can indicate to the resource management controller 304 and/or the workload scheduler 306 to determine fine-grained orchestration results and/or schedule the workloads to execute at the remote edge platform. The orchestrator interface 302 is additionally configured to transmit and/or receive coarse-grained orchestration results, fine-grained orchestration results, a schedule of workloads, and/or telemetry data to/from a remote edge platform and/or another computer. In some examples, the orchestrator interface 302 can interface with the capability controller 204 to determine the capabilities of the edge platform 200.

In the example of FIG. 3, by offloading (e.g., handing-off) telemetry data to be processed at a remote edge platform and/or another computer, an orchestrator at an edge platform can achieve more efficient orchestration results at a reduced power and/or resource capacity. For example, a remote edge platform (e.g., a near-edge platform) and/or another computer, can include a larger history of operation conditions at the edge platform that offloaded the telemetry data as well as the operating conditions at other ones of edge platforms. As such, the remote edge platform (e.g., a near-edge platform) and/or another computer can compare between scheduling a workload at the edge platform that offloaded the telemetry data and ones of other edge platforms.

In some examples, the example orchestrator interface 302 implements example means for interfacing. The interfacing means is implemented by executable instructions such as those illustrated by at least blocks 402 and 406 of FIG. 4, and/or at least blocks 504, 506, and 512 of FIG. 5, and/or at least blocks 704, 706, and 708 of FIG. 7, and/or at least blocks 802, 806, 808, 810, 816, 818, and 820 of FIG. 8, and/or at least block 904 of FIG. 9, which may be executed on at least one processor such as the example processor 1012 shown in the example of FIG. 10. In other examples, the orchestrating means is implemented by hardware logic, hardware implemented state machines, logic circuitry, and/or any other combination of hardware, software, and/or firmware.

In the illustrated example of FIG. 3, the orchestrator 202 includes the resource management controller 304. The resource management controller 304 is configured to manage resource consumption of resource(s) 210 by orchestration components (e.g., the orchestration interface 302, the resource management controller 304, the workload scheduler 306, and/or the orchestration database 310) and/or other components of the edge platform 200 (e.g., the capability controller 204, the telemetry controller 206, the EP database 208 and/or the resource(s) 210). Generally, the resource management controller 304 monitors the utilization of power and/or various other resources by orchestration components and/or other components of an edge platform. Depending on the amount of resources that is available at the edge platform, and the estimated or pledged amount of each to the workloads executing at the edge platform, the resource management controller 304 may raise, lower, or transfer the work for telemetry and orchestration to a next near-edge tier.

In some examples, the resource management controller 304 executes software and/or firmware and/or one or more bitstream kernels to facilitate management of resource consumption at the edge platform 200. In some examples, the resource management controller 304 executes software and/or firmware without executing bitstream kernels and/or other compute kernels. In some examples, the resource management controller 304 executes compute kernels without executing software and/or firmware (e.g., with some or no footprint from software running on a general-purpose processor or special purpose processor (e.g., a CPU, Intel's Xeon processor, etc.).

In some examples, the resource management controller 304 executes software and/or firmware at other computation capable platforms such as smart-NICs, board management controllers (BMCs), etc. Generally, the resource management controller 304 regulates local orchestration mechanisms at the edge platform 200 and can utilize acceleration, when that is available (e.g., when an edge platform includes accelerators), to process orchestration tasks.

To manage the resources at an edge platform (e.g., the edge platform 200), the resource management controller 304 requests, from an orchestrator at a remote edge platform and/or another computer, coarse-grained orchestration result or fine-grained orchestration results. Additionally or alternatively, the resource management controller 304 can manage resources at an edge platform based on KPIs associated with an application (e.g., a workload, service, etc.). For example, telemetry data retrieved from the telemetry controller 206 can include indications of KPIs associated with a service and/or workload executing at a given resource (e.g., ones of the resource(s) 210). In such examples, the resource management controller 304 and/or the orchestrator 202 can adjust resource allocation at the edge platform 200 to meet given SLOs of an SLA for each service and/or workload executing at the edge platform 200. Additionally or alternatively, the resource management controller 304 estimates, based on the telemetry data collected by the orchestrator interface 302, the amount of resources to be utilized by various services, applications, and/or workloads assigned to the edge platform to meet the respective SLAs associated with each of the services, applications, and/or workloads. Based on the amount of services estimated to be utilized, the resource management controller 304 determines what quantity of resources may be released from, or made available to, the orchestration components at the edge platform, with an upper bound based on the configuration settings.

In the example illustrated in FIG. 2, the resource management controller 304 is configured to, based on the telemetry data collected by the orchestrator interface 302 and/or based on KPIs and/or SLOs of applications executing at the edge platform 200, compare the resource currently allocated to, or that will be allocated to, orchestration components to configuration settings for the orchestrator 202. In some examples, the telemetry data can indicate the amount of resources available at an edge platform and the recently estimated or recently pledged amount of resources to be used to execute one or more workloads in the near future. In some examples, the resource management controller 304 can be configured to operate conditionally based on the resource consumption of individual orchestration components (e.g., ones of the orchestrator interface 302, the resource management controller 304, the workload scheduler 306, the thermal controller 308, and/or the orchestration database 310). For example, if the resource management controller 304 allocates 10% of a processors resources at a first power level, the resource management controller 304 can be pre-configured to allocate 5% of a processors resources at a second power level (e.g., where the second is less than the first). The configuration settings can include a vector of values specifying what quantity of resources (e.g., ones of the resource(s) 210) is permissible to expend (e.g., permissible to use) on orchestration components at an edge platform (e.g., the edge platform 200). For example, configuration settings for each component is configured with the resource management controller 304 ahead of time. In some examples, the configuration settings can specify what quantity of resources (e.g., ones of the resource(s) 210) is permissible to expend (e.g., permissible to use) on orchestration components at each tier in the meta-orchestration architecture described herein. The vectors shown below illustrates configuration settings for m≥1 resources at n≥1 power levels (PLs).

$$P_v = \begin{Bmatrix} \{PL_1, \% \text{ of } Resource_1\}, \ldots, \{PL_n, \% \text{ of } Resource_1\} \\ \vdots \\ \{PL_1, \% \text{ of } Resource_m\}, \ldots, \{PL_n, \% \text{ of } Resource_m\} \end{Bmatrix}$$

Configuration Settings

In the illustrated example of FIG. 2, the resource management controller 304 is configured to determine whether the amount of resource currently allocated or that will be allocated to orchestration components meets a preliminary threshold. For example, the preliminary threshold can correspond to a first power level that indicates the edge platform is in a reduced power state. If the amount of resource(s) currently allocated to or that will be allocated to orchestration components meets the preliminary threshold, the orchestrator 202 offloads that telemetry data to be processed at another computer to obtain course-grained orchestration results.

Additionally or alternatively, the resource management controller 304 is configured to determine whether the amount of resource currently allocated or that will be allocated to orchestration components meets a secondary threshold. For example, the secondary threshold can correspond to a second power level that indicates the edge platform is in a critical power state. For example, the secondary threshold can correspond to a second power level lower than a first power level corresponding to the preliminary threshold. If the amount of resource currently allocated or that will be allocated to orchestration components meets the secondary threshold, the orchestrator 202 can offload that telemetry data to be processed at another computer to obtain fine-grained orchestration results. In some examples, the amount of resources currently allocated or that will be allocated to orchestration components can correspond to thermal conditions as well as physical resources and/or software resources. For example, configuration settings can be based on thermal conditions at an edge platform in addition to or as an alternative to those configuration settings based on power level. In such examples, the preliminary threshold and/or the secondary threshold can correspond to (a) an amount (e.g., a percentage) of power being consumed by and/or that will be consumed by orchestration components and/or (b) thermal conditions (e.g., temperature) at an edge platform and/or of orchestration components. Resource allocation and/or offloading of telemetry data and/or orchestration tasks can be based on the amount of resources currently allocated to and/or that will be allocated to orchestration resources at the edge platform to meet and/or achieve KPIs and/or SLOs of an application (e.g., a service, a workload, etc.).

In the illustrated example of FIG. 2, if the amount of resource currently allocated or that will be allocated to orchestration components fails to meet the preliminary threshold or the secondary threshold, the resource management controller 304 is configured to estimate resources (e.g., ones of the resource(s) 210) to allocate to workloads assigned to an edge platform (e.g., the edge platform 200) to meet and/or otherwise satisfy respective SLAs associated with the workloads. Additionally, the resource management controller 304 is configured to estimate resources (e.g., ones of the resource(s) 210) to allocate orchestration components (e.g., the orchestrator interface 302, the resource management controller 304, the workload scheduler 306, the thermal controller 308, and/or the orchestration database 310) of an edge platform (e.g., the edge platform 200). For example, the resource management controller 304 determines resource allocation values based on one or more workloads scheduled (e.g., soon, in the near future, etc.) to be executed at an edge platform (e.g., the edge platform).

In the example of FIG. 3, based on the estimated resources to allocate to the workloads at an edge platform and/or the estimated resources to allocate to the orchestration components at the edge platform, the resource management controller 304 scales (e.g., is configured to scale) orchestration at the edge platform to meet the estimated resource allocation values. For example, the resource management controller 304 reduces, increases, and/or otherwise adjusts scheduling of workloads at the edge platform and/or reduce, increase, and/or otherwise adjust monitoring rates for SLAs at the edge platform. Additionally or alternatively, such adjustment may include setting each of the orchestration components at the edge platform to slower operation (e.g., slower clock speed), and/or configuring orchestration components to generate coarse-grained orchestration result in a low power mode of operation.

In the example of FIG. 3, the resource management controller 304 adjusts and/or otherwise throttles resource consumptions or orchestration components in a variety of ways. For example, the resource management controller 304 can define goals for the orchestrator 202. Such goals may be defined by an edge service provider, a service level agreement, and/or any other suitable entity. The goals can include operating under 5% resource consumption for a particular resource. In some examples where the transmission of data between edge platforms is pertinent to a service, the goal associated with that service may be to operate the orchestration components under 5% consumption of the bandwidth of an edge platform. In other examples, the goal may be to operate the orchestration components under 5% of the overall power consumption of the edge platform.

In additional or alternative examples, the goal can include operating orchestration components at reduced latency. In some examples, when resources and/or power are particularly limited at an edge platform (e.g., below the second threshold), the goal can include operating orchestration components to obtain course-grained orchestration results. For example, the resource management controller 304 adjusts resources allocated to the orchestration components based on a look up table (LUT) including proportional distribution of resources to orchestration components.

In the example of FIG. 3, adjusting and/or otherwise throttling resource consumptions or orchestration components (e.g., via the resource management controller 304) can include adjusting (e.g., reducing, increasing, etc.) the amount of resources allocated to each of the orchestration components, adjusting (e.g., reducing, increasing, etc.) the amount of telemetry data to be processed by the orchestration component for each of the workloads (e.g., consumed by the orchestration components), and/or any other technique to adjust resource consumption by orchestration components.

In the illustrated example of FIG. 3, when adjusting the amount of telemetry data to be processed by the orchestration component, the resulting telemetry data can be utilized by the resource management controller 304 to meet workload SLAs and/or requested performance metrics. For example, the resource management controller 304 configures telemetry components (e.g., the telemetry controller 206) in a low power mode. Additionally or alternatively, the resource management controller 304 reduces (e.g., slowdown) and/or otherwise adjusts how often the resource management controller 304 processes telemetry data or the type of processing (e.g., the granularity of processing) carried out on telemetry data by the resource management controller 304. For example, an orchestration component, telemetry component, and/or other component can be configured to produce summary information about operation, instead of generating sub-component by sub-component telemetry data.

In some examples, the resource management controller 304 adjusts and/or otherwise throttles resource consumptions or orchestration components by reducing, increasing, and/or otherwise adjusting the amount of resources assigned to a telemetry component (e.g., the telemetry controller 206). In some examples, the resource management controller 304 adjusts resource consumption of orchestration components by reducing, increasing, and/or adjusting the amount of telemetry data available to (e.g., sent to, accessed by, etc.) the resource management controller 304 and/or other orchestration components.

In the example of FIG. 3, when the orchestrator 202 offloads telemetry data to be processed at a remote edge platform and/or another computer to obtain course-grained orchestration results, the resource management controller 304 shuts down (e.g., disable, terminate, etc.) processing of telemetry data at the edge platform and indicate to the orchestrator interface 302, that the orchestrator interface 302 is to transmit telemetry data to a remote edge platform and/or another compute for processing (e.g., data mining). In some examples, when a first resource is in high demand for a given workload and a second resource is demanded at a comparatively lower rate, the orchestrator 202 offloads orchestration and/or scheduling related to the first resource while orchestration and/or scheduling of the second resource are maintained at the edge platform. The orchestrator interface 302 can then monitor the remote edge platform and/or other computer for the processed (e.g., mined) orchestration results. When the orchestrator 202 receives course-grained orchestration results, the resource management controller 304 determines whether the resources currently allocated to orchestration components and/or the resources that will be allocated to orchestration components in the near future meets the secondary threshold.

In the illustrated example of FIG. 3, if the resource management controller 304 determines that the resources currently allocated to orchestration components and/or the resources that will be allocated to orchestration components in the near future meets the secondary threshold, the orchestrator 202 offloads telemetry data to be processed at another computer and/or a remote edge platform to obtain fine-grained orchestration results. In some examples, prior to offloading telemetry data, the orchestrator interface 302 can pre-process telemetry data based on the amount of bandwidth available to an edge platform and/or allocated to the orchestrator 202 and/or the power that will be utilized to transmit the telemetry data to a remote edge platform. For example, to pre-process telemetry data, the orchestrator interface 302 can compress and/or filter the telemetry data prior to transmitting the telemetry data to a remote edge platform. In some examples, the orchestrator interface 302 can filter the telemetry data for data related to KPIs and/or SLOs of applications (e.g., services, workloads, etc.) executing at the edge platform 200. If the resource management controller 304 determines that the resources currently allocated to orchestration components and/or the resources that will be allocated to orchestration components in the near future does not meet the secondary threshold, the resource management controller 304 estimates the resources to allocate to orchestration components based on the course-grained orchestration results. In some examples, the resource management controller 304 determines fine-grained orchestration results based on the coarse-grained orchestration results.

In the example illustrated in FIG. 3, when the orchestrator 202 offloads telemetry data to be processed at another computer and/or a remote edge platform, the resource management controller 304 halts (e.g., disables, terminates, etc.) processing of telemetry data and orchestration tasks at an edge platform and transmit telemetry data to a remote edge platform and/or another computer to obtain fine-grained orchestration results. Optionally, when the edge platform includes hardware accelerators, the resource management controller 304 can reconfigure itself and/or the workload scheduler 306 to process telemetry data and/or generate workload schedules utilizing coarser, accelerator-based (e.g., statistic-based and/or sample-based) techniques that reduce the number of orchestration decisions based on an exhaustive volume of telemetry data.

In the example of FIG. 3, when an edge platform does not include hardware accelerators, the resource management controller 304 can shut down (e.g., disable, terminate, etc.) processing of telemetry data and orchestration tasks at the edge platform to prevent exhaustive analysis of detailed telemetry data. When an edge platform does not include hardware accelerators, the resource management controller 304 can reconfigure itself and/or the workload scheduler 306 to computationally lighter, sampled or reduced telemetry data (e.g., summarized) based techniques to obtain orchestration results (e.g., orchestration inferences).

In examples described herein, offloading of orchestration-related processing may be reversed, when power and/or other resource availability becomes normal. For example, hysteresis mechanisms may be utilized to control the transfer of processing orchestration-related tasks and/or telemetry data, so that a prolonged mode of normal availability of power is observed before the orchestrator 202 at an edge platform that offloaded processing of orchestration tasks and/or telemetry data reverts processing of such tasks and/or data.

In some examples, the example resource management controller 304 implements example means for managing resources. The resource management means is implemented by executable instructions such as that illustrated by at least blocks 408, 410, 412, 418, 420, and 422 of FIG. 4, and/or at least blocks 502 and 508 of FIG. 5, and/or at least blocks 602, 604, 606, 608, 610, 612, 614, 616, and 618 of FIG. 6, and/or at least blocks 702, 710, 714, and 716 of FIG. 7, and/or at least blocks 804 and 814 of FIG. 8, which may be executed on at least one processor such as the example processor 1012 shown in the example of FIG. 10. In other examples, the resource management means is implemented by hardware logic, hardware implemented state machines, logic circuitry, and/or any other combination of hardware, software, and/or firmware.

In the example of FIG. 3, the orchestrator 202 includes the workload scheduler 306. The workload scheduler 306 generally schedules one or more workloads, services, and/or applications to execute at an edge platform. In some examples, scheduling includes accessing a task received and/or otherwise obtained by the resource management controller 304 and provide the task to one or more of the resources at an edge platform (e.g., ones of the resource(s) 210) to execute or complete. In some examples, scheduling includes selecting ones of workloads assigned to an edge platform to offload to a remote edge platform to be executed.

In the example of FIG. 3, the resources (e.g., the resource(s) 210) execute a workload based on a description of the workload included in the task. The workload scheduler 306 accesses a result of the execution of the workload from one or more of the resources at the edge platform (e.g., ones of the resource(s) 210) that executed the workload. The workload scheduler 306 provides the result to the device that requested the workload to be executed, such as a client compute platform and/or other edge platform. In some examples, the workload scheduler 306 is configured to determine whether a candidate schedule satisfies one or more SLAs associated with one or more workloads.

In some examples, the example workload scheduler 306 implements example means for scheduling. The scheduling means is implemented by executable instructions such as that illustrated by at least blocks 424 and 426 of FIG. 4, and/or at least block 510 of FIG. 5, and/or at least block 718 of FIG. 7, and/or at least blocks 812 and 822 of FIG. 8, and/or at least blocks 918, 920, and 924 of FIG. 9, which may be executed on at least one processor such as the example processor 1012 shown in the example of FIG. 10. In other examples, the scheduling means is implemented by hardware logic, hardware implemented state machines, logic circuitry, and/or any other combination of hardware, software, and/or firmware.

In the example illustrated in FIG. 3, the orchestrator 202 includes the thermal controller 308. The thermal controller 308 is configured to facilitate agile and adaptive management of thermal conditions at an edge platform. Particularly in far-edge environments, passive cooling may be the norm, given both the power utilization and equipment maintenance challenges of using active cooling. Even when active cooling is employed, such cooling may be exercised as a secondary resort (e.g., to reduce and/or control power utilization).

In the example of FIG. 3, the thermal controller 308 is configured to monitor temperature values of resources (e.g., CPUs, chipsets, and/or peripherals) of an edge platform. The thermal controller 308 can be configured to operate in at least two modes of operation. For example, in a first mode of operation, the thermal controller 308 manages thermal conditions at the edge platform without considering workload specific characteristics. In a second mode of operation, the thermal controller 308 manages thermal conditions at the edge platform while considering workload specific characteristics. In the first mode of operation, when the thermal controller 308 detects excessive heat (e.g., temperature above a threshold level), the thermal controller 308 increases cooling (e.g., by raising fan speed) and/or throttles computation (e.g., lower clock rate). In the first mode of operation, the thermal controller 308 uniformly applies power management strategies across all tenants sharing an edge platform.

In the example of FIG. 3, tenant workloads can specify an expected completion time that defines an execution window in which the thermal controller 308 can optimize power. Each component of an edge platform can operate at differing power-performance levels that include different power efficiencies for different levels. The power-performance "optimal point" is the level where (1) the most computation can be achieved without throttling based on the temperature and (2) idle power (as a percentage of total power used to complete a workload) is negligible. The sum of the components used to perform a tenant workload at an edge platform can be expressed in terms of number of instructions at a performance per watt at some temperature.

$$WL_{COST} = \text{Instructions} * \text{Power} * \left(\frac{\text{Temperature}}{\text{Weighting Factor}}\right)$$

Workload (WL) Cost Function

In the above workload cost function, instructions represent the number of operations that are utilized to perform a workload and/or function. The instructions can be architecture specific or can be based on a generic instruction set architecture common across many proprietary architectures. Additionally or alternatively, the instructions may be represented as a bitstream kernel (e.g., commonly used by FPGAs) and/or any other suitable compute kernel. Power represents energy dissipated over time. In such a representation, the more time available to perform a workload, the lower the instantaneous power dissipation that is to be utilized to execute the workload. By computing the workload cost per tenant at an edge platform, the thermal controller 308 determines an estimate of the deviance from the performance "optimal point." In the workload cost function, a temperature at which the workload cost is determined can be adjusted by a weighting factor. The weighting factor can be tuned to "optimal point" for a resource.

In the example of FIG. 3, the thermal controller 308 computes a model (e.g., a Markov chain) involving several possible workload cost options. For example, the model can be based on various machine learning techniques to achieves a balance among competing objectives. Models can include Markov chains, bin packing models, support vector machine models, etc.). Based on the model, the workload scheduler 306 selects an optimal multi-tenant schedule for an edge platform (e.g., based on the current resource configuration). The workload scheduler 306 utilizes a model-based schedule (e.g., a Markov-based schedule) to determine how best to schedule tenant workloads. The workload scheduler 306, for example, can determine, based on the model generated by the thermal controller 308, that several tenant workloads can be run at a lower clock speed over a longer period of time. Thermal controller 308 can configure the resources of the edge platform to execute at the target clock speed (e.g., clock rate) and the workload scheduler 306 can schedule these tenant workloads to share that edge platform.

In the example of FIG. 3, the thermal controller 308 may determine that by controlling physical facility chillers (e.g., air-based chillers, liquid-based chillers, refrigeration-based chillers). In such an example, the thermal controller 308 brings the temperature at the edge platform down to avoid throttling due to temperature. In such an example, there is a trade-off that the thermal controller 308 additionally considers. For example, when reducing the temperature to avoid throttling, an added energy cost of running the chillers is incurred. Based on SLAs associated with workloads, the thermal controller 308 evaluates whether the SLA allows the added cost, and if the SLA permits the additional cost, the thermal controller 308 can configure the active cooling of the edge platform and the workload scheduler 306 can schedule the workload to execute at the edge platform.

In some examples, the example thermal controller 308 implements example means for controlling thermal conditions. The thermal conditions controlling means is implemented by executable instructions such as that illustrated by at least blocks 902, 906, 908, 910, 912, 914, 916, and 922 of FIG. 9, which may be executed on at least one processor such as the example processor 1012 shown in the example of FIG. 10. In other examples, the thermal conditions controlling means is implemented by hardware logic, hardware implemented state machines, logic circuitry, and/or any other combination of hardware, software, and/or firmware.

In the illustrated example of FIG. 3, the orchestrator 202 includes the orchestration database 310 to store data associated with orchestration. For example, the orchestration database 310 can store telemetry data, workloads, models, schedules, SLAs, SLOs, KPIs, one or more LUTs including proportional distribution of resources to orchestration components, and/or compute kernels. In some examples, the compute kernels facilitate utilization of hardware accelerators to implement any of the orchestrator interface 302, the resource management controller 304, the workload scheduler 306, and/or the thermal controller 308. For example, the orchestration database 310 can include a library of bitstream kernels (e.g., FPGA images) that perform various orchestration tasks to produce summarized telemetry data and/or to determine coarse-grained orchestration results (e.g., robotic control decisions for orchestration) when computational resources and/or power are in reduced supply. The compute kernels can be configured and provisioned independently by an edge service provider and registered into the edge platform and/or registered with the orchestrator 202 via the capability controller 204. In some examples, the orchestration database 310 can be utilized to reduce and/or filter telemetry data when offloading telemetry data to a remote edge platform.

In the example of FIG. 3, the orchestration database 310 can be implemented by a volatile memory (e.g., a SDRAM, DRAM, RDRAM, etc.) and/or a non-volatile memory (e.g., flash memory). The orchestration database 310 can additionally or alternatively be implemented by one or more DDR memories, such as DDR, DDR2, DDR3, DDR4, mDDR, etc. The orchestration database 310 can additionally or alternatively be implemented by one or more mass storage devices such as hard disk drive(s), compact disk drive(s), digital versatile disk drive(s), solid-state disk drive(s), etc. While in the illustrated example the orchestration database 310 is illustrated as a single database, the orchestration database 310 can be implemented by any number and/or type(s) of databases. Furthermore, the data stored in the orchestration database 310 can be in any data format such as, for example, binary data, comma delimited data, tab delimited data, SQL structures, etc.

In the example illustrated in FIG. 3, the orchestrator interface 302, the resource management controller 304, the workload scheduler 306, the thermal controller 308, and orchestration database 310 are included in, correspond to, and/or otherwise is/are representative of the orchestrator 202. However, in some examples, one or more of the orchestrator interface 302, the resource management controller 304, the workload scheduler 306, the thermal controller 308, and orchestration database 310 can be included in another component of the edge platform 200 rather than as a single component. In some examples, one or more of the orchestrator interface 302, the resource management controller 304, the workload scheduler 306, the thermal controller 308, and orchestration database 310 is/are separate devices included in an edge platform. Further, one or more of the orchestrator interface 302, the resource management controller 304, the workload scheduler 306, the thermal controller 308, and orchestration database 310 can be implemented at any one of the resource(s) 210. For example, one or more of the orchestrator interface 302, the resource management controller 304, the workload scheduler 306, the thermal controller 308, and orchestration database 310 can be separate devices such as one or more CPUs (e.g., multi-core CPUs), one or more FPGAs, one or more GPUs, one or more NICs, one or more VPUs, etc., and/or any other type of hardware or hardware accelerator. In such examples, the resource(s) 210 can include, correspond to, and/or otherwise be representative of virtualization(s) of the one or more CPUs, the one or more FPGAs, the one or more GPUs, the one more NICs, etc. In other examples, the orchestrator interface 302, the resource management controller 304, the workload scheduler 306, the thermal controller 308, and orchestration database 310, and/or, more generally, the orchestrator 202, can include, correspond to, and/or otherwise be representative of one or more software resources, virtualizations of the software resources, etc., such as hypervisors, load balancers, OSes, VMs, etc., and/or a combination thereof.

While an example manner of implementing the orchestrator 202 of FIG. 2 is illustrated in FIG. 3, one or more of the elements, processes and/or devices illustrated in FIG. 3 may be implemented by global and/or local loop protocols. In some examples, one or more of the elements, processes and/or devices illustrated in FIG. 3 may be implemented by power and telemetry monitoring and management logic, local orchestration components, and/or service accelerated telemetry processing logic. While the examples disclosed herein have been described in the context of power metrics (an important metric in green energy-based edge platforms), other metrics can be utilized. For example, the examples disclosed herein can utilize additional or alternative metrics including thermal metrics, additional key performance indicators. Based on the metrics utilized, examples disclosed herein can decide which orchestration actions to take at an edge platform.

More generally, two or more tiers may be defined in the meta-orchestration architecture described herein such that an Nth tier may take delegation from an Nth−1 tier, for the processing of telemetry data and/or for execution of orchestration tasks and/or processes. Additionally or alternatively, two or more tiers may be defined in the meta-orchestration architecture described herein such that an Nth tier may take delegation from an Nth−1 tier for processing of power and/or resource usage regulation flows. Generally offloaded operations can be processed at a coarser grain since the Nth tier may be more distant from the actual resources, including power, to be monitored and orchestrated.

While an example manner of implementing the edge platform 200 of FIG. 2 is illustrated in FIG. 2 and an example manner of implementing the orchestrator 202 of FIG. 2 is illustrated in FIG. 3, one or more of the elements, processes and/or devices illustrated in FIGS. 2 and 3 may be combined, divided, re-arranged, omitted, eliminated and/or implemented in any other way. Further, the example orchestrator 202, the example capability controller 204, the example telemetry controller 206, the example EP database 208, the example resource(s) 210, and/or, more generally, the example edge platform 200, and/or the example orchestrator interface 302, the example resource management controller 304, the example workload scheduler 306, the example thermal controller 308, the example orchestration database 310, and/or, more generally, the example orchestrator 202 of FIGS. 2 and 3 may be implemented by hardware, software, firmware and/or any combination of hardware, software and/or firmware. Thus, for example, any of the example orchestrator 202, the example capability controller 204, the example telemetry controller 206, the example EP database 208, the example resource(s) 210, and/or, more generally, the example edge platform 200, and/or the example orchestrator interface 302, the example resource management controller 304, the example workload scheduler 306, the example thermal controller 308, the example orchestration database 310, and/or, more generally, the example orchestrator 202 of FIGS. 2 and 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example orchestrator 202, the example capability controller 204, the example telemetry controller 206, the example EP database 208, the example resource(s) 210, and/or, more generally, the example edge platform 200, and/or the example orchestrator interface 302, the example resource management controller 304, the example workload scheduler 306, the example thermal controller 308, the example orchestration database 310, and/or, more generally, the example orchestrator 202 of FIGS. 2 and 3 is/are hereby expressly defined to include a non-transitory computer readable storage device or storage disk such as a memory, a digital versatile disk (DVD), a compact disk (CD), a Blu-ray disk, etc. including the software and/or firmware. Further still, the example edge platform 200 of FIG. 2 and/or the example orchestrator 202 of FIGS. 2 and/or 3 may include one or more elements, processes and/or devices in addition to, or instead of, those illustrated in FIGS. 2 and/or 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowchart representative of example hardware logic, machine readable instructions, hardware implemented state machines, and/or any combination thereof for implementing the orchestrator 202 of FIGS. 2 and/or 3 are shown in FIGS. 4, 5, 6, 7, 8, and/or 9. The machine readable instructions may be one or more executable programs or portion(s) of an executable program for execution by a computer processor such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 4, 5, 6, 7, 8, and/or 9, many other methods of implementing the example orchestrator 202 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 4, 5, 6, 7, 8, and/or 9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 4:
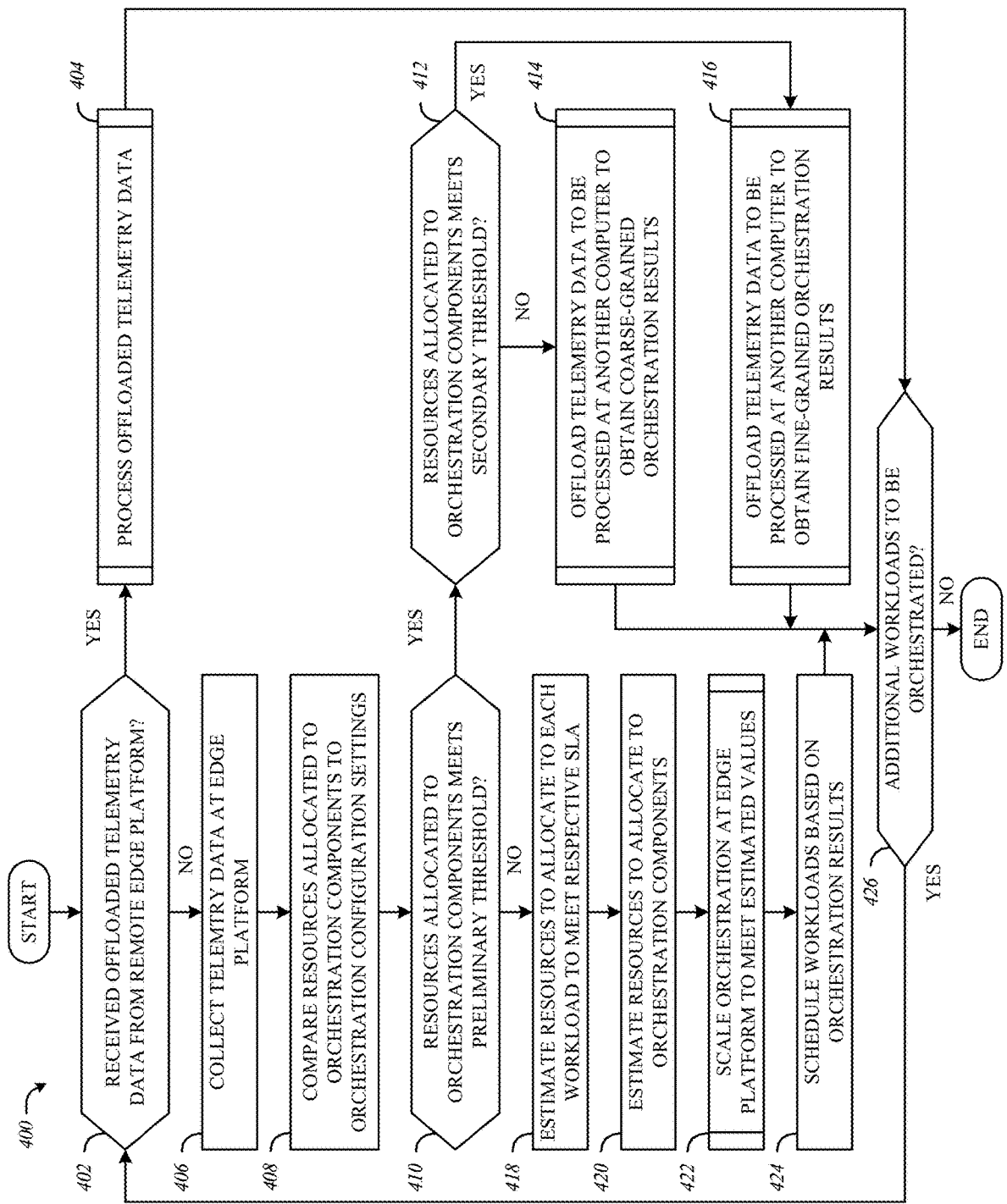
FIG. 4 is a flowchart representative of example machine readable instructions that may be executed to implement the example orchestrator of FIGS. 2 and 3 to control processing of telemetry data at an edge platform based on resource availability.

FIG. 4 is a flowchart representative of example machine readable instructions 400 that may be executed to implement the example orchestrator 202 of FIGS. 2 and 3, and/or, more generally, the edge platform 200 of FIG. 2 to control processing of telemetry data at an edge platform based on resource availability. The machine readable instructions 400 begin at block 402 where the orchestrator interface 302, and/or, more generally, the orchestrator 202, determines whether the orchestrator 202 and/or edge platform 200 has received offloaded telemetry data from a remote edge platform. Responsive to the orchestrator interface 302 determining that the orchestrator 202 and/or edge platform 200 has received offloaded telemetry data from a remote edge platform (block 402: YES), the machine readable instructions 400 proceed to block 404 where the orchestrator 202 processes the offloaded telemetry data. After block 404, the machine readable instructions 400 proceed to block 426. Detailed example machine readable instructions to process offloaded telemetry data are illustrated and described in connection with FIG. 5.

In the example of FIG. 4, responsive to the orchestrator interface 302 determining that the orchestrator 202 and/or edge platform 200 has not received offloaded telemetry data from a remote edge platform (block 402: NO), the machine readable instructions 400 proceed to block 406 where the orchestrator interface 302, and/or, more generally, the orchestrator 202, collects telemetry data. For example, the orchestrator interface 302 can collect telemetry data from the telemetry controller 206 and/or directly from one or more orchestration components (e.g., the orchestrator interface 302, the resource management controller 304, the workload scheduler 306, the thermal controller 308, and/or the orchestration database 310). Based on the telemetry data, at block 408, the resource management controller 304, and/or, more generally, the orchestrator 202, compares the resources currently allocated to orchestration components and/or resources that will be allocated to orchestration components in the near future to configuration settings associated with the orchestrator 202.

In the example illustrated in FIG. 4, at block 410, the resource management controller 304, and/or, more generally, the orchestrator 202, determines whether the resources allocated to orchestration components and/or resource that will be allocated to orchestration components in the near future meets a preliminary threshold. For example, the preliminary threshold corresponds to a first level of utilization (e.g., a first power level) that indicates the edge platform is in a low availability state (e.g., a reduced power state). Responsive to the resource management controller 304 determining that the resources allocated to orchestration components and/or resources that will be allocated to orchestration components in the near future meet the preliminary threshold (block 410: YES), the machine readable instructions 400 proceed to block 412.

In the example of FIG. 4, at block 412, the resource management controller 304, and/or, more generally, the orchestrator 202, determines whether the resources allocated to orchestration components and/or the resources that will be allocated to orchestration components in the near future meets a secondary threshold. For example, the secondary threshold corresponds to a second level of utilization (e.g., a second power level) that reflects greater utilization of a resource than the preliminary threshold (e.g., a lower power level than the first power level). Responsive to the resource management controller 304 determining that the resources allocated to orchestration components and/or the resources that will be allocated to orchestration components in the near future do not meet a secondary threshold (block 412: NO), the machine readable instructions 400 proceed to block 414.

In the illustrated example of FIG. 4, at block 414, the orchestrator 202 offloads telemetry data to be processed at another computer to obtain coarse-grained orchestration results. After block 414, the machine readable instructions 400 proceed to block 426. Detailed example machine readable instructions to offload telemetry data to be processed at another computer to obtain coarse-grained orchestration results are illustrated and described in connection with FIG. 7. Responsive to the resource management controller 304 determining that the resources allocated to orchestration components and/or the resources that will be allocated to orchestration components in the near future meet a secondary threshold (block 412: YES), the machine readable instructions 400 proceed to block 416, where the orchestrator 202 offloads telemetry data to be processed at another computer to obtain fine-grained orchestration results. Detailed example machine readable instructions to offload telemetry data to be processed at another computer to obtain coarse-grained orchestration results are illustrated and described in connection with FIG. 8. After block 416, the machine readable instructions 400 proceed to block 426.

Returning to block 410, responsive to the resource management controller 304 determining that the resources allocated to orchestration components and/or resources that will be allocated to orchestration components in the near future do not meet the preliminary threshold (block 410: NO), the machine readable instructions 400 proceed to block 418. At block 418, the resource management controller 304, and/or, more generally, the orchestrator 202, estimates the resources to allocate to workloads assigned to the edge platform 200 to meet a respective SLA of each workload.

In the example of FIG. 4, at block 420, the resource management controller 304, and/or, more generally, the orchestrator 202, estimates resources to allocate to orchestration components (e.g., the orchestrator interface 302, the resource management controller 304, the workload scheduler 306, the thermal controller 308, and/or the orchestration database 310). At block 422, the resource management controller 304, and/or, more generally, the orchestrator 202, scales orchestration at the edge platform 200 to meet the estimated values determined at block 418 and/or block 420. In some examples, the resource management controller 304 can adjust orchestration components individually. For example, the resource management controller 304 can reduce the resources allocated to a first orchestration component (e.g., the workload scheduler 306) to 50% and reduce the resources allocated to a second orchestration component (e.g., the orchestrator interface 302) to 10%. Detailed example machine readable instructions to scale orchestration at an edge platform are illustrated and described in connection with FIG. 6.

In the example illustrated in FIG. 4, at block 424, the workload scheduler 306, and/or, more generally, the orchestrator 202, schedules one or more workloads assigned to the edge platform 200 based on the orchestration results. After block 424, the machine readable instructions 400 proceed to block 426. At block 426, the workload scheduler 306, and/or, more generally, the orchestrator 202, determines whether there are additional workloads to be orchestrated. Responsive to the workload scheduler 306 determining that there are additional workloads to be orchestrated (block 426: YES), the machine readable instructions 400 proceed to block 402. Responsive to the workload scheduler 306 determining that there are not additional workloads to be orchestrated (block 426: NO), the machine readable instructions 400 terminate.

Figure 5:
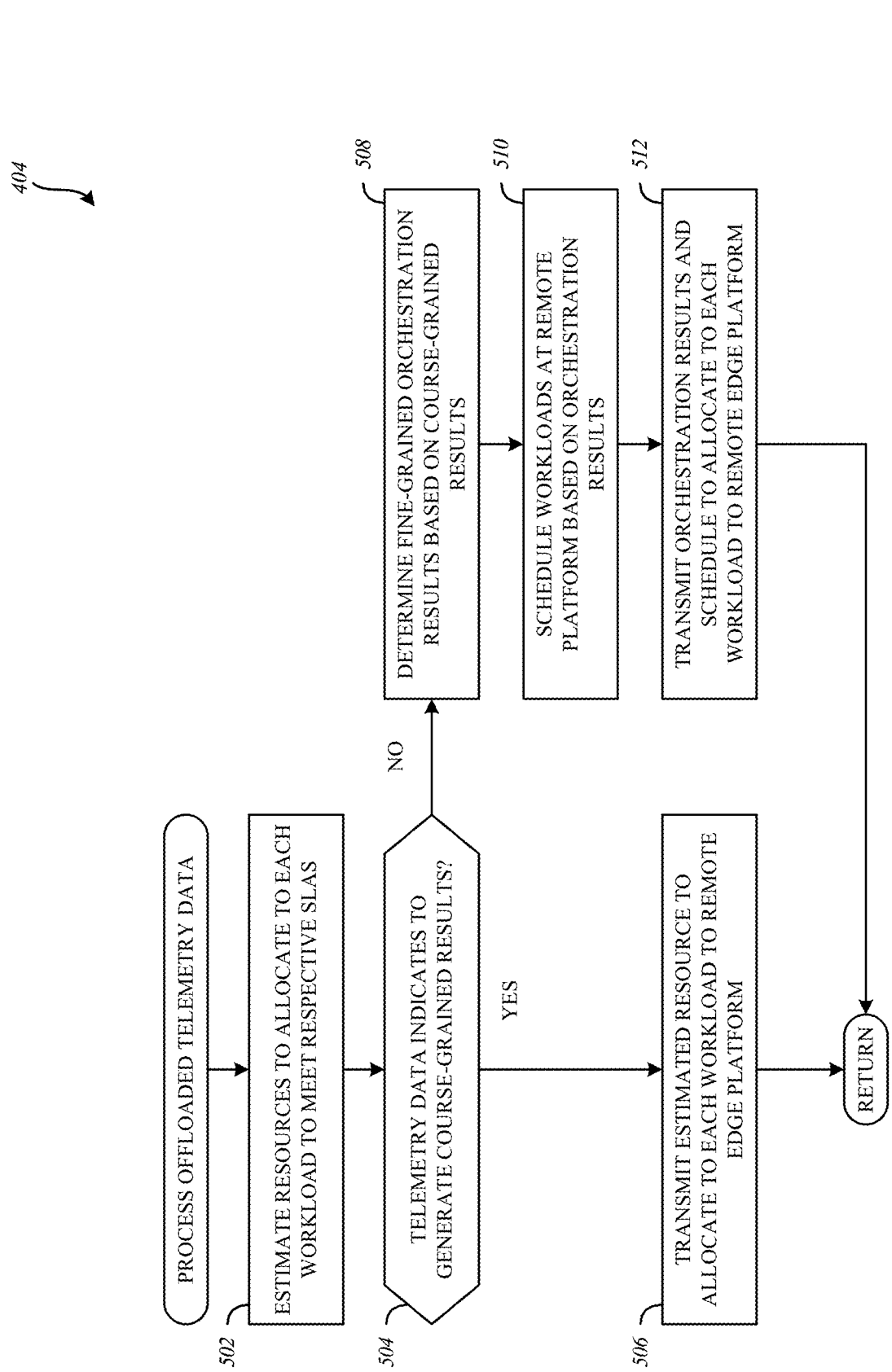
FIG. 5 is a flowchart representative of example machine readable instructions that may be executed to implement the example orchestrator of FIGS. 2 and/or 3 to process offloaded telemetry data.

FIG. 5 is a flowchart representative of example machine readable instructions 404 that may be executed to implement the example orchestrator 202 of FIGS. 2 and 3, and/or, more generally, the edge platform 200 of FIG. 2 to process offloaded telemetry data. The machine readable instructions 404 begin at block 502 where the resource management controller 304, and/or, more generally, the orchestrator 202, estimates the resources to allocate to workloads assigned to the remote edge platform to meet a respective SLA of each workload. At block 504, the orchestrator interface 302, and/or, more generally, the orchestrator 202, determines whether the telemetry data indicates to generate coarse-grained orchestration results.

In the example of FIG. 5, responsive to the orchestrator interface 302 determining that the telemetry data indicates to generate coarse-grained orchestration results (block 504: YES), the machine readable instructions 404 proceed to block 506. At block 506, the orchestrator interface 302, and/or, more generally, the orchestrator 202, transmits, to the remote edge platform, the estimated resources to allocate to the remote edge platform workloads. After block 506, the machine readable instructions 404 return to the machine readable instructions 400 of block 426. Responsive to the orchestrator interface 302 determining that the telemetry data indicates to generate coarse-grained orchestration results (block 504: NO), the machine readable instructions 404 proceed to block 508. At block 508, the resource management controller 304, and/or, more generally, the orchestrator 202, determines fine-grained orchestration results based on the course-grained orchestration results.

In the illustrated example of FIG. 5, at block 510, the workload scheduler 306, and/or, more generally, the orchestrator 202, generates a schedule for the one or more workloads assigned to the remote edge platform based on the orchestration results. At block 512, the orchestrator interface 302, and/or, more generally, the orchestrator 202, transmits the orchestration results and/or the schedule to the remote edge platform that offloaded the telemetry data. After block 512, the machine readable instructions 404 return to the machine readable instructions 400 at block 426.

Figure 6:
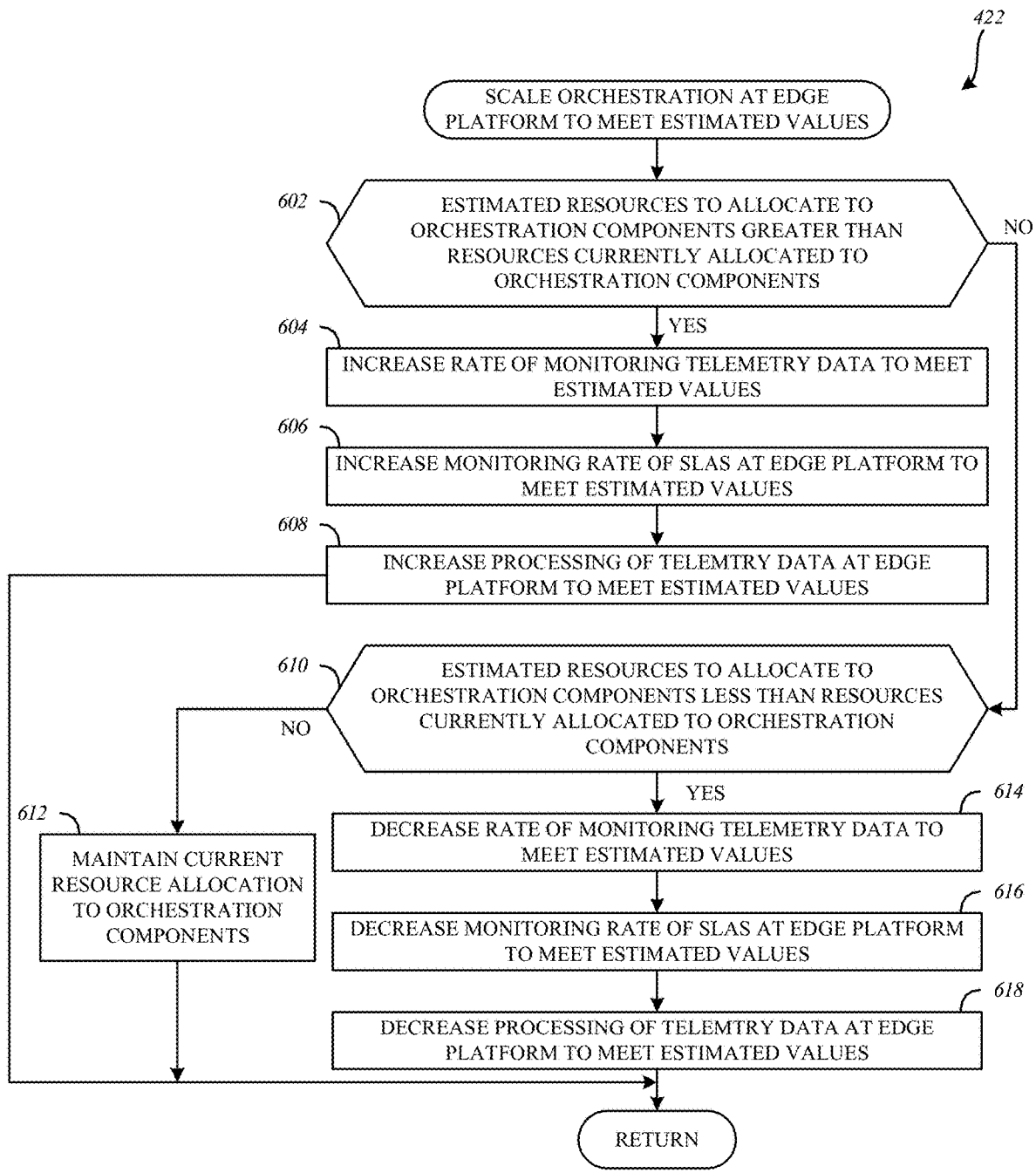
FIG. 6 is a flowchart representative of example machine readable instructions that may be executed to implement the example orchestrator of FIGS. 2 and/or 3 to scale orchestration at an edge platform.

FIG. 6 is a flowchart representative of example machine readable instructions 422 that may be executed to implement the example orchestrator 202 of FIGS. 2 and 3, and/or, more generally, the edge platform 200 of FIG. 2 to scale orchestration at an edge platform. The machine readable instructions 422 begin at block 602 where the resource management controller 304, and/or, more generally, the orchestrator 202, determines whether the estimated resources to allocate to orchestration components is greater than the resources currently allocated to the orchestration resources. Responsive to the resource management controller 304 determining that the estimated resources to allocate to orchestration components are not greater than the resources currently allocated to the orchestration resources (block 602: NO), the machine readable instructions 422 proceed to block 610.

In the example of FIG. 6, responsive to the resource management controller 304 determining that the estimated resources to allocate to orchestration components is greater than the resources currently allocated to the orchestration resources (block 602: YES), the machine readable instructions 422 proceed to block 604. At block 604, the resource management controller 304, and/or, more generally, the orchestrator 202, increases the rate of monitoring telemetry data at the edge platform to meet the estimated values.

In the example illustrated in FIG. 6, at block 606, the resource management controller 304, and/or, more generally, the orchestrator 202, increases the monitoring rate of SLAs associated with workloads assigned to the edge platform to meet the estimated values. At block 608, the resource management controller 304, and/or, more generally, the orchestrator 202, increases the processing resources expended when processing telemetry data to meet the estimated values. After block 608, the machine readable instructions 422 return to the machine readable instructions 400 at block 424. At block 610, the resource management controller 304, and/or, more generally, the orchestrator 202, determines whether the estimated resources to allocate to orchestration components is less than the resources currently allocated to the orchestration resources. Responsive to the resource management controller 304 determining that the estimated resources to allocate to orchestration components are not less than the resources currently allocated to the orchestration resources (block 610: NO), the machine readable instructions 422 proceed to block 612.

In the example of FIG. 6, at block 612, the resource management controller 304, and/or, more generally, the orchestrator 202, maintains the current resource allocation to orchestration components at the edge platform. After block 612, the machine readable instructions 422 return to the machine readable instructions 400 at block 424. Returning to block 610, responsive to the resource management controller 304 determining that the estimated resources to allocate to orchestration components are less than the resources currently allocated to the orchestration resources (block 610: YES), the machine readable instructions 422 proceed to block 614.

In the illustrated example of FIG. 6, at block 614, the resource management controller 304, and/or, more generally, the orchestrator 202, decreases the rate of monitoring telemetry data at the edge platform to meet the estimated values. For example, the resource management controller 304 can adjust the frequency of monitoring telemetry data based on a priority (e.g., priority level) associated with resources (e.g., the resource(s) 210) at an edge platform (e.g., the edge platform 200). In some examples, the resource management controller 304 can categorize resources at an edge platform into groups. For example, a first group can be top priority where the resource management controller 304 can slightly adjust (e.g., reduces) telemetry monitoring frequency associated with ones of the resources of the first group, a second group can be of middle priority where the resource management controller 304 can adjust (e.g., reduce) telemetry monitoring frequency associated with ones of the resources of the second group, and a third group can be of low priority where the resource management controller 304 can stop telemetry monitoring frequency associated with ones of the resources of the third group. At block 616, the resource management controller 304, and/or, more generally, the orchestrator 202, decreases the monitoring rate of SLAs associated with workloads assigned to the edge platform to meet the estimated values. At block 618, the resource management controller 304, and/or, more generally, the orchestrator 202, decreases the processing resources expended when processing telemetry data to meet the estimated values. Additional or alternative example techniques to scale orchestration at edge platforms are described in detail in connection with FIG. 3.

Figure 7:
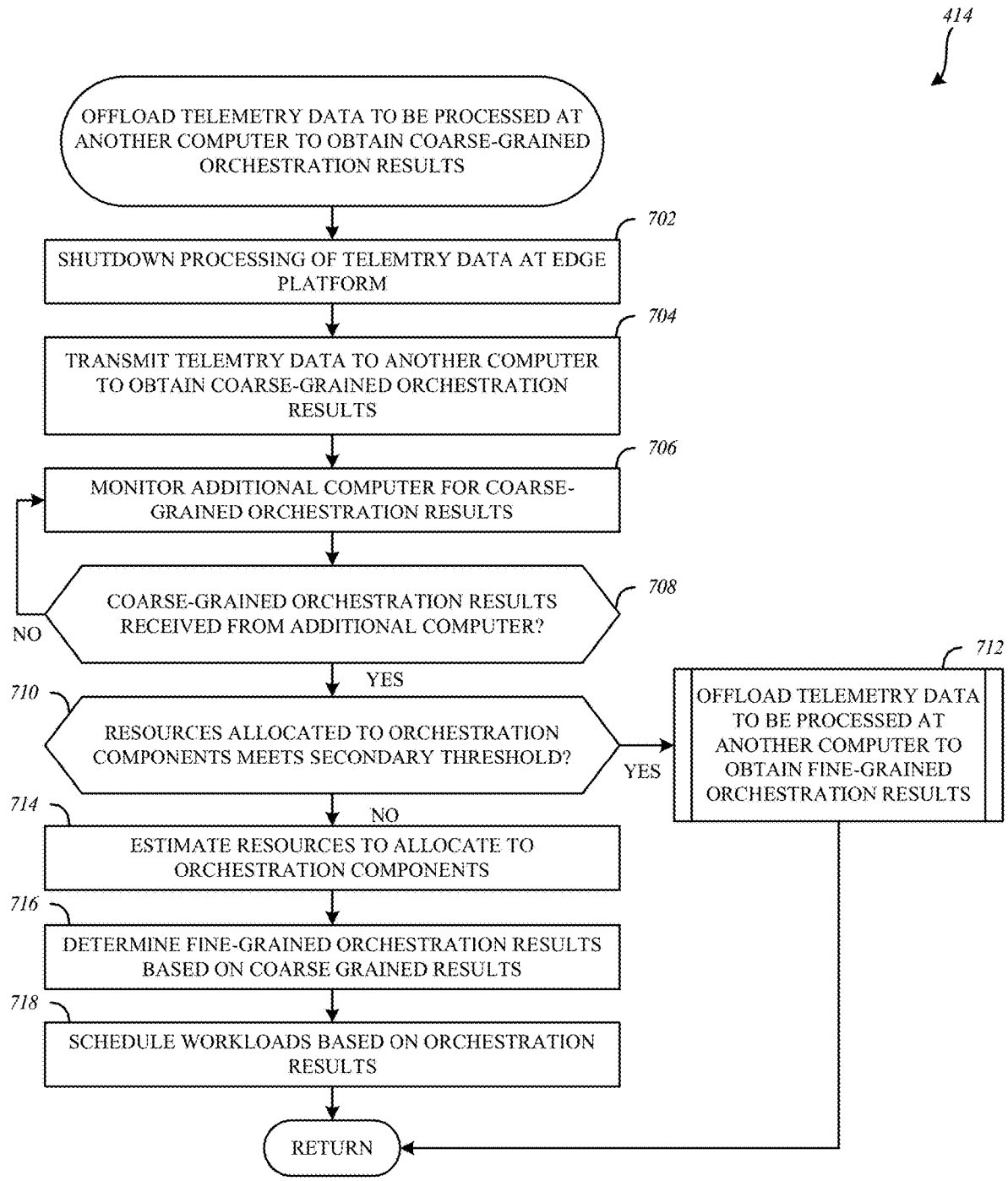
FIG. 7 is a flowchart representative of example machine readable instructions that may be executed to implement the example orchestrator of FIGS. 2 and/or 3 to offload telemetry data to be processed at another computer to obtain coarse grained orchestration results.

FIG. 7 is a flowchart representative of example machine readable instructions 414 that may be executed to implement the example orchestrator 202 of FIGS. 2 and 3, and/or, more generally, the edge platform 200 of FIG. 2 to offload telemetry data to be processed at another computer to obtain coarse grained orchestration results. The machine readable instructions 414 begin at block 702 where the resource management controller 304, and/or, more generally, the orchestrator 202, shuts down (e.g., disables, terminates, etc.) processing of telemetry data at the edge platform.

In the example of FIG. 7, at block 704, the orchestrator interface 302, and/or, more generally, the orchestrator 202, transmits telemetry data from the edge platform to another computer (e.g., an accelerator and/or a remote edge platform) to obtain coarse-grained orchestration results. For example, block 704 can include the orchestrator interface 302 transmitting telemetry data from the edge platform to another computer to obtain coarse-grained orchestration results. At block 706, the orchestrator interface 302, and/or, more generally, the orchestrator 202, monitors the additional computer (e.g., the accelerator and/or the remote edge platform) for the coarse-grained orchestration results. At block 708, the orchestrator interface 302, and/or, more generally, the orchestrator 202, determines whether the coarse-grained orchestration results have been received from the additional computer.

In the example illustrated in FIG. 7, responsive to the orchestrator interface 302 determining that the coarse-grained orchestration results have not been received from the additional computer (block 708: NO), the machine readable instructions 414 proceed to block 706. Responsive to the orchestrator interface 302 determining that the coarse-grained orchestration results have been received from the additional computer (block 708: YES), the machine readable instructions 414 proceed to block 710. At block 710, the resource management controller 304, and/or, more generally, the orchestrator 202, determines whether the resources allocated to the orchestration components meet the secondary threshold.

In the example illustrated in FIG. 7, responsive to the resource management controller 304 determining that the resources allocated to the orchestration components meet the secondary threshold (block 710: YES), the machine readable instructions 414 proceed to block 712. At block 712, the orchestrator 202 offloads telemetry data to be processed at another computer to obtain fine-grained orchestration results. After block 712, the machine readable instructions 414 return to the machine readable instructions 400 at block 426.

Returning to block 710, responsive to the resource management controller 304 determining that the resources allocated to the orchestration components do not meet the secondary threshold (block 710: NO), the machine readable instructions 414 proceed to block 714. At block 714, the resource management controller 304, and/or, more generally, the orchestrator 202, estimates the resources to allocate to the orchestration components at the edge platform. At block 716, the resource management controller 304, and/or, more generally, the orchestrator 202, determines fine-grained orchestration results based on the coarse-grained orchestration results. At block 718, the workload scheduler 306, and/or, more generally, the orchestrator 202, schedules workloads to execute at the edge platform based on the orchestration results. After block 718, the machine readable instructions 414 return to the machine readable instructions 400 at block 426.

Figure 8:
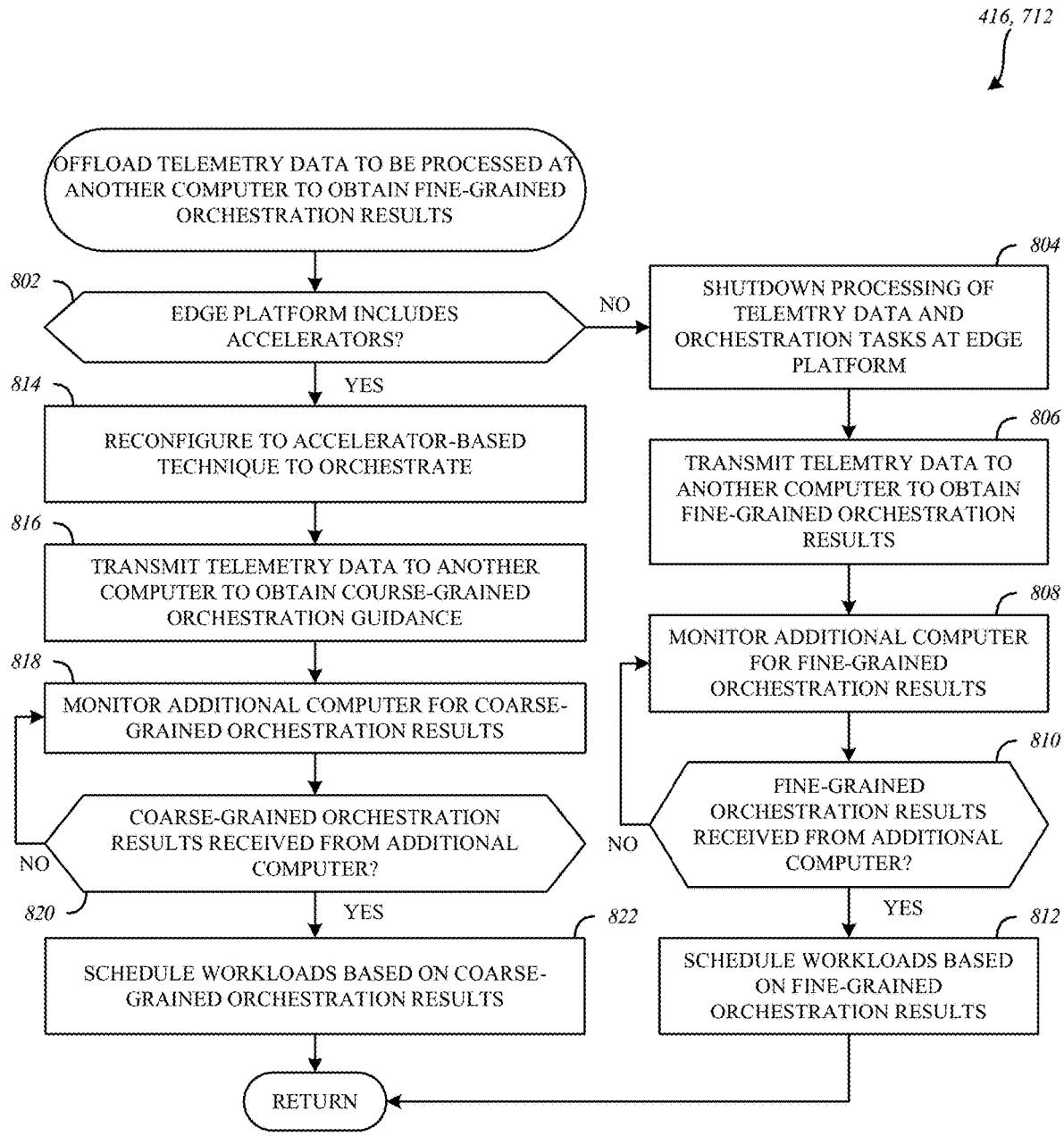
FIG. 8 is a flowchart representative of example machine readable instructions that may be executed to implement the example orchestrator of FIGS. 2 and/or 3 to offload telemetry data to be processed at another computer to obtain fine grained orchestration results.

FIG. 8 is a flowchart representative of example machine readable instructions 416, 712 that may be executed to implement the example orchestrator 202 of FIGS. 2 and 3, and/or, more generally, the edge platform 200 of FIG. 2 to offload telemetry data to be processed at another computer to obtain fine grained orchestration results. The machine readable instructions 416, 712 begin it block 802 where the orchestrator interface 302, and/or, more generally, the orchestrator 202, determines whether the edge platform includes accelerators. Responsive to the orchestrator interface 302 determining that the edge platform does not include accelerators (block 802: NO), the machine readable instructions 416, 712 proceed to block 804.

In the example of FIG. 8, at block 804, the resource management controller 304, and/or, more generally, the orchestrator 202, shuts down (e.g., disables, terminates, etc.) processing of telemetry data and orchestration tasks at the edge platform. At block 806, the orchestrator interface 302, and/or, more generally, the orchestrator 202, transmits telemetry data another computer to obtain fine-grained orchestration results. For example, block 806 can include the orchestrator interface 302 transmitting telemetry data from the edge platform to another computer to obtain fine-grained orchestration results. At block 808, the orchestrator interface 302, and/or, more generally, the orchestrator 202, monitors the additional computer for fine-grained orchestration results. At block 810, the orchestrator interface 302, and/or, more generally, the orchestrator 202, determines whether fine-grained orchestration results have been received from the additional computer.

In the illustrated example of FIG. 8, responsive to the orchestrator interface 302 determining that fine-grained orchestration results have not been received from the additional computer (block 810: NO), the machine readable instructions 416, 712 proceed to block 808. Responsive to the orchestrator interface 302 determining that fine-grained orchestration results have been received from the additional computer (block 810: YES), the machine readable instructions 416, 712 proceed to block 812. At block 812, the workload scheduler 306, and/or, more generally, the orchestrator 202, schedules workloads to execute at the edge platform based on the fine-grained orchestration results. After block 812, the machine readable instructions 416, 712 return to the machine readable instructions 400 at block 426 and/or the machine readable instructions 414 to return to the machine readable instructions 400 at block 426.

Returning to block 802, responsive to the orchestrator interface 302 determining that the edge platform does include accelerators (block 802: YES), the machine readable instructions 416, 712 proceed to block 814. At block 814, the resource management controller 304, and/or, more generally, the orchestrator 202, reconfigures to an accelerator-based (e.g., statistic-based) technique of orchestration. For example, the resource management controller 304 can execute orchestration utilizing compute kernels. At block 816, the orchestrator interface 302, and/or, more generally, the orchestrator 202, transmits telemetry data to another computer to obtain coarse-grained orchestration results. For example, block 816 can include the orchestrator interface 302 transmitting telemetry data from the edge platform to another computer to obtain coarse-grained orchestration results. At block 818, the orchestrator interface 302, and/or, more generally, the orchestrator 202, monitors the additional computer for coarse-grained orchestration results. At block 818, the orchestrator interface 302, and/or, more generally, the orchestrator 202, determines whether coarse-grained orchestration results have been received from the additional computer.

In the illustrated example of FIG. 8, responsive to the orchestrator interface 302 determining that coarse-grained orchestration results have not been received from the additional computer (block 820: NO), the machine readable instructions 416, 712 proceed to block 818. Responsive to the orchestrator interface 302 determining that coarse-grained orchestration results have been received from the additional computer (block 820: YES), the machine readable instructions 416, 712 proceed to block 822. At block 822, the workload scheduler 306, and/or, more generally, the orchestrator 202, schedules workloads to execute at the edge platform based on the coarse-grained orchestration results. After block 822, the machine readable instructions 416, 712 return to the machine readable instructions 400 at block 426 and/or the machine readable instructions 414 to return to the machine readable instructions 400 at block 426.

Figure 9:
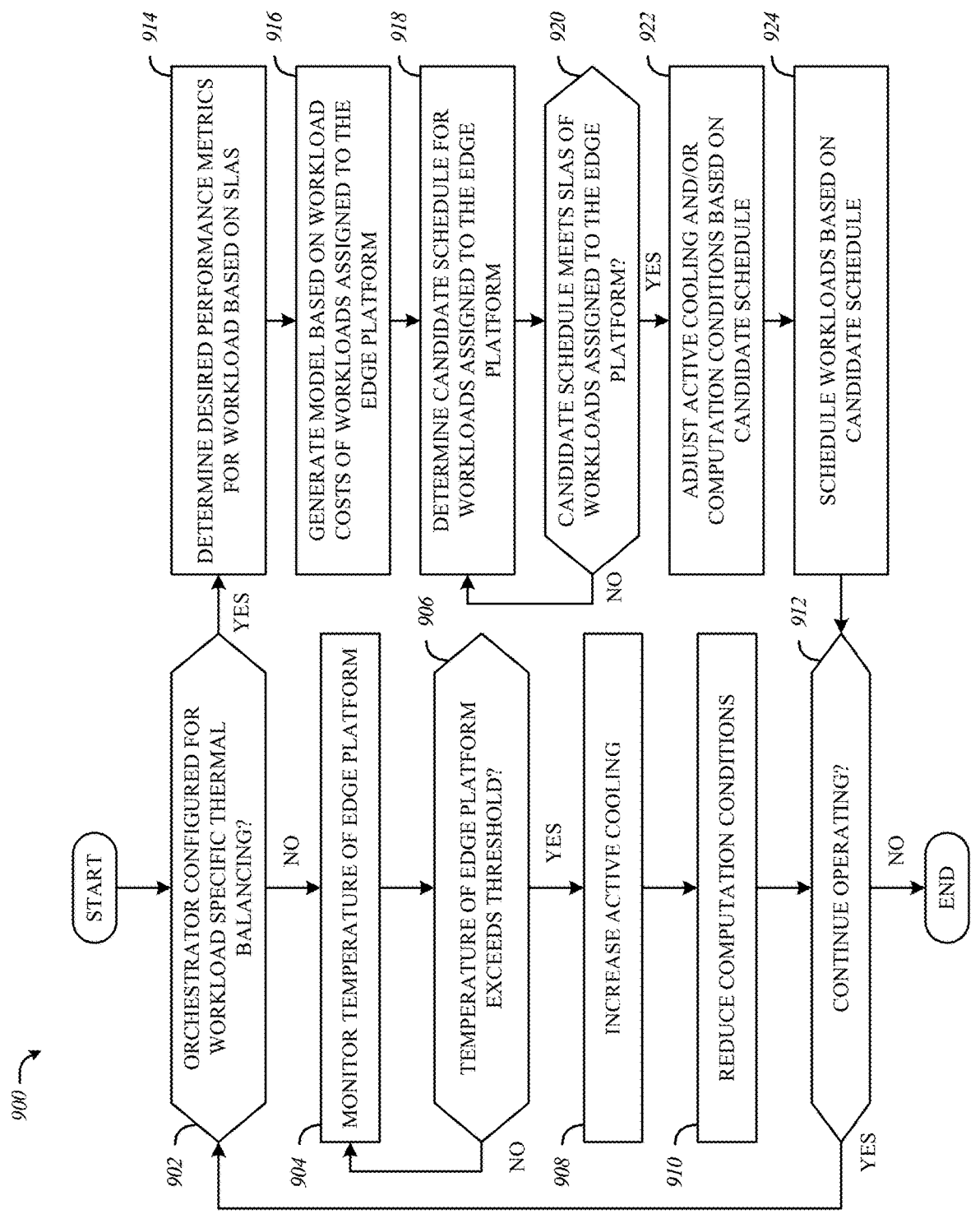
FIG. 9 is a flowchart representative of example machine readable instructions that may be executed to implement the example orchestrator of FIGS. 2 and/or 3 to control processing of telemetry data at an edge platform based on a temperature at the edge platform.

FIG. 9 is a flowchart representative of example machine readable instructions 900 that may be executed to implement the example orchestrator 202 of FIGS. 2 and 3, and/or, more generally, the edge platform 200 of FIG. 2 to control processing of telemetry data at an edge platform based on temperature at the edge platform. The machine readable instructions 900 begin at block 902 where the thermal controller 308, and/or, more generally, the orchestrator 202, determines whether the orchestrator 202 is configured for workload specific thermal balancing and/or planning.

In the example of FIG. 9, responsive to the thermal controller 308 determining that the orchestrator 202 is not configured for workload specific thermal balancing (block 902: NO), the machine readable instructions 900 proceed to block 904. At block 904, the orchestrator interface 302, and/or, more generally, the orchestrator 202 monitors the temperature of the edge platform and/or the orchestration components. At block 906, the thermal controller 308, and/or, more generally, the orchestrator 202, determines whether the temperature of the edge platform and/or the orchestration components exceeds a threshold temperature. For example, the threshold temperature can be a temperature that has been classified as "extreme" by the edge service provider, an OEM, a silicon vendor, etc.

In the illustrated example of FIG. 9, responsive to the thermal controller 308 determining that the temperature of the edge platform and/or the orchestration components do not exceed a threshold temperature (block 906: NO), the machine readable instructions 900 proceed to block 904. Responsive to the thermal controller 308 determining that the temperature of the edge platform and/or the orchestration components exceeds a threshold temperature (block 906: YES), the machine readable instructions 900 proceed to block 908. At block 908, the thermal controller 308, and/or, more generally, the orchestrator 202, increases the active cooling at the edge platform. At block 910, the thermal controller 308, and/or, more generally, the orchestrator 202, reduces the computation conditions at the edge platform. For example, the thermal controller 308 can configure the orchestrator 202 and/or more generally, the edge platform 200 to operate at a lower clock speed (e.g., rate).

In the example of FIG. 9, at block 912, the thermal controller 308, and/or, more generally, the orchestrator 202 determines whether to continue operating. For example, conditions that could cause the thermal controller 308 to stop operating can include a loss of power, a reconfiguration to not provide active and/or adaptive cooling. Responsive to the thermal controller 308 determining to continue operating (block 912: YES), the machine readable instructions 900 proceed to block 902. Responsive to the thermal controller 308 determining not to continue operating (block 912: NO), the machine readable instructions 900 terminate.

Returning to block 902, responsive to the thermal controller 308 determining that the orchestrator 202 is configured for workload specific thermal balancing (block 902: YES), the machine readable instructions 900 proceed to block 914. At block 914, the thermal controller 308, and/or, more generally, the orchestrator 202, determines desired performance metrics (e.g., key performance indicators, etc.) for workloads assigned to an edge platform based on SLAs. At block 916, the thermal controller 308, and/or, more generally, the orchestrator 202, generates a model based on workload costs of the workloads assigned to the edge platform.

In the example of FIG. 9, at block 918, the workload scheduler 306, and/or, more generally, the orchestrator 202, determines a candidate schedule for the workloads assigned to the edge platform. At block 920, the workload scheduler 306, and/or, more generally, the orchestrator 202, determines whether the candidate schedule meets SLAs of the workloads assigned to the edge platform. Responsive to the workload scheduler 306 determining that the candidate schedule does not meet at least one SLA of the workloads assigned to the edge (block 920: NO), the machine readable instructions 900 proceed to block 918. Responsive to the workload scheduler 306 determining that the candidate schedule meets the SLAs of the workloads assigned to the edge (block 920: YES), the machine readable instructions 900 proceed to block 922.

In the illustrated example of FIG. 9, at block 922, the thermal controller 308, and/or, more generally, the orchestrator 202, adjusts active cooling and/or computation conditions at the edge platform and/or of the orchestration resources based on the candidate schedule. At block 924, the workload schedule 306, and/or, more generally, the orchestrator 202, schedules the workloads assigned to the edge platform based on the candidate schedule. After block 924, the machine readable instructions 900 proceed to block 912.

Figure 10:
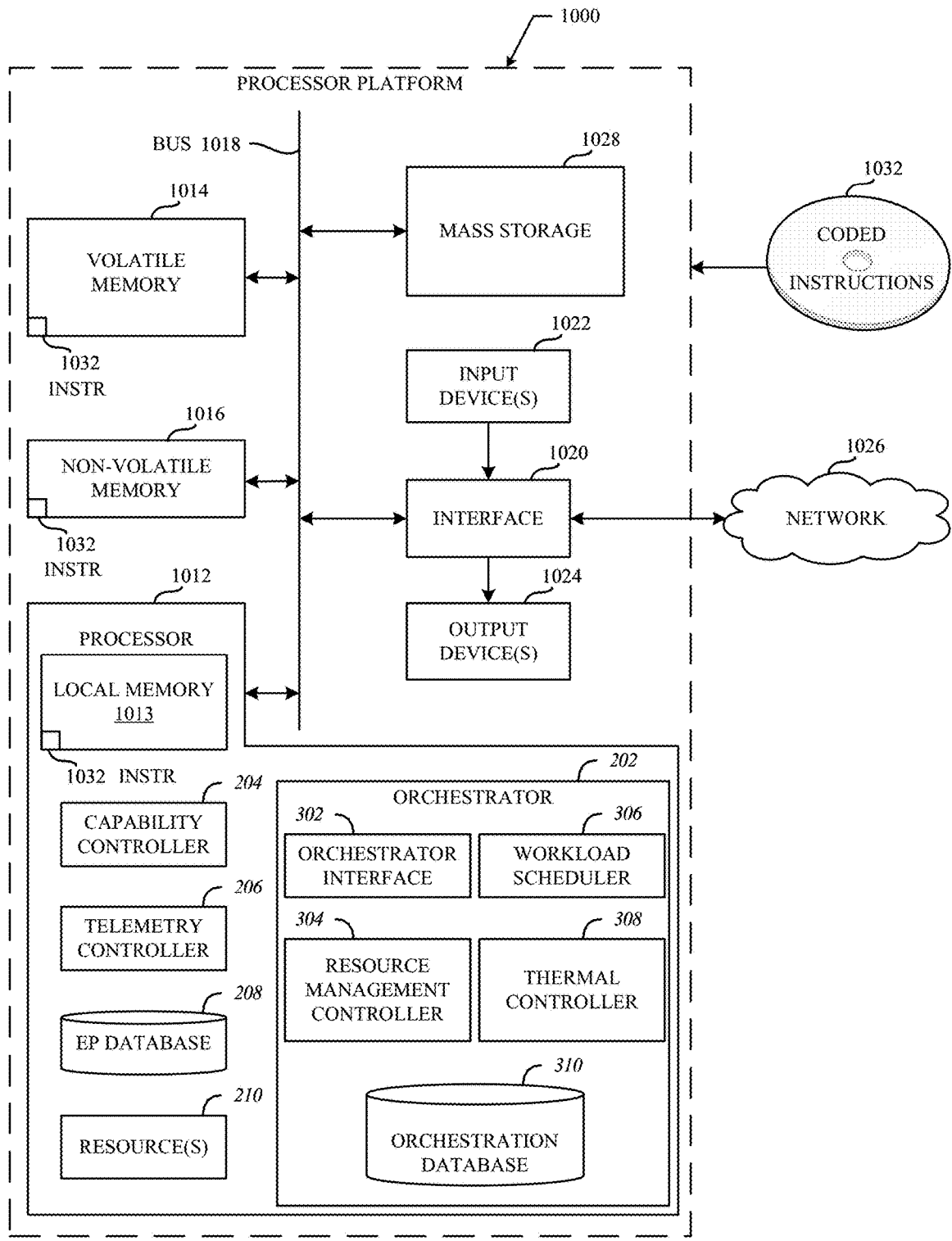
FIG. 10 is a block diagram of an example processing platform structured to execute the instructions of FIGS. 4, 5, 6, 7, 8, and/or 9 to implement the orchestrator of FIGS. 2 and/or 3.

FIG. 10 is a block diagram of an example processing platform structured to execute the instructions of FIGS. 4, 5, 6, 7, 8, and 9 to implement the orchestrator 202 of FIGS. 2 and 3. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor 1012 may be a semiconductor based (e.g., silicon based) device. In this example, the processor 1012 implements the example orchestrator 202, the example capability controller 204, the example telemetry controller 206, the example EP database 208, the example resource(s) 210, and/or, more generally, the example edge platform 200, and/or the example orchestrator interface 302, the example resource management controller 304, the example workload scheduler 306, the example thermal controller 308, the example orchestration database 310, and/or, more generally, the example orchestrator 202 of FIGS. 2 and 3.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIGS. 4, 5, 6, 7, 8, and 9 may be stored in the mass storage device 1028, in the volatile memory 1014, in the non-volatile memory 1016, and/or on a removable non-transitory computer readable storage medium such as a CD or DVD.

From the foregoing, it will be appreciated that example methods, apparatus and articles of manufacture have been disclosed that control processing of telemetry data at an edge platform. Examples disclosed herein include a decentralized orchestration control plane that incorporates the expansive value plane implicit in edge and/or cloud computing. Examples disclosed herein adapt to keep orchestration and telemetry as just-in-time, just-as-needed, and just-where-practical. Examples disclosed herein simplify integration of heterogeneous computational capabilities (e.g., CPUs, GPUs, FPGAs, VPUs, etc.), by decoupling the orchestration control plane from the resources, including in intermittently powered or sparsely resourced infrastructures. Examples disclosed herein include a framework that allows telemetry and orchestration to be implemented as services (e.g., telemetry as a service (TaaS) and/or orchestration as a service (OaaS)) that may be provisioned and shaped on demand and accelerated where possible.

The disclosed methods, apparatus and articles of manufacture improve the efficiency of using a computing device by adjusting the computation resources expended on orchestrating workloads at an edge platform based on the available power and/or thermal levels of the edge platform. Examples disclosed herein reduce the computational burden associated with processing workloads at an edge platform by offloading more computationally intensive portions of orchestration tasks to remote computers and obtaining orchestration results from those remote computers. The disclosed methods, apparatus and articles of manufacture improve the efficiency of using a computing device by reducing the hardware overhear associated with orchestrating workloads at an edge platform, reducing the computational burden associated with orchestrating workloads at an edge platform, and reducing the power consumption associated with orchestrating workloads at an edge platform. The disclosed methods, apparatus and articles of manufacture are accordingly directed to one or more improvement(s) in the functioning of a computer.

Example methods, apparatus, systems, and articles of manufacture to control processing of telemetry data at an edge platform are disclosed herein. Further examples and combinations thereof include the following:

Example 1 includes an apparatus to control processing of telemetry data at an edge platform, the apparatus comprising an orchestrator interface to, responsive to an amount of resources allocated to an orchestrator to orchestrate a workload at the edge platform meeting a first threshold, transmit telemetry data associated with the orchestrator to a computer to obtain a first orchestration result at a first granularity, a resource management controller to determine a second orchestration result at a second granularity to orchestrate the workload at the edge platform, the second granularity finer than the first granularity, and a scheduler to schedule a workload assigned to the edge platform based on the second orchestration result.

Example 2 includes the apparatus of example 1, wherein the resource management controller is configured to compare the amount of resources allocated to the orchestrator to configuration settings associated with the orchestrator, determine whether the amount of resources allocated to the orchestrator meets the first threshold, and responsive to the amount of resources allocated to the orchestrator meeting the first threshold, determine whether the amount of resources allocated to the orchestrator meets a second threshold.

Example 3 includes the apparatus of example 2, wherein the configuration settings identify an amount of resources that can be allocated to the orchestrator at a power level.

Example 4 includes the apparatus of example 2, wherein the configuration settings identify an amount of resources that can be allocated to the orchestrator at a thermal condition.

Example 5 includes the apparatus of example 1, wherein the orchestrator interface is configured to collect the telemetry data, and responsive to the amount of resources allocated to the orchestrator meeting a second threshold, transmit the telemetry data associated with the orchestrator to a computer to obtain a third orchestration result at the second granularity.

Example 6 includes the apparatus of example 5, wherein the second threshold is lower than the first threshold.

Example 7 includes the apparatus of example 1, wherein the amount of resources is a first amount of resources, and the resource management controller is configured to responsive to the first amount of resources allocated to the orchestrator not meeting the first threshold, estimate a second amount of resources to allocate to the orchestrator, and scale the first amount of resources allocated to the orchestrator to meet the second amount of resources, wherein the second amount of resources corresponds to an amount of resources to meet performance indicators associated with the workload.

Example 8 includes the apparatus of example 1, wherein the resource management controller is configured to scale the amount of resources allocated to the orchestrator based on a priority level associated with ones of the resources.

Example 9 includes the apparatus of example 1, wherein the amount of resources allocated to the orchestrator meets the first threshold when the amount of resources is less than or equal to the first threshold.

Example 10 includes the apparatus of example 1, wherein the orchestrator interface is configured to monitor a temperature of the edge platform.

Example 11 includes the apparatus of example 10, further including a thermal controller to, responsive to the temperature of the edge platform exceeding a threshold temperature increase cooling at the edge platform, and reduce computation conditions of resources at the edge platform.

Example 12 includes a non-transitory computer readable storage medium comprising data which may be configured into executable instructions and, when configured and executed, cause at least one processor to at least responsive to an amount of resources allocated to an orchestrator to orchestrate a workload at an edge platform meeting a first threshold, transmit telemetry data associated with the orchestrator to a computer to obtain a first orchestration result at a first granularity, determine a second orchestration result at a second granularity to orchestrate the workload at the edge platform, the second granularity finer than the first granularity, and schedule a workload assigned to the edge platform based on the second orchestration result.

Example 13 includes the non-transitory computer readable storage medium of example 12, wherein the instructions, when configured and executed, cause the at least one processor to compare the amount of resources allocated to the orchestrator to configuration settings associated with the orchestrator, determine whether the amount of resources allocated to the orchestrator meets the first threshold, and responsive to the amount of resources allocated to the orchestrator meeting the first threshold, determine whether the amount of resources allocated to the orchestrator meets a second threshold.

Example 14 includes the non-transitory computer readable storage medium of example 13, wherein the configuration settings identify an amount of resources that can be allocated to the orchestrator at a power level.

Example 15 includes the non-transitory computer readable storage medium of example 13, wherein the configuration settings identify an amount of resources that can be allocated to the orchestrator at a thermal condition.

Example 16 includes the non-transitory computer readable storage medium of example 12, wherein the instructions, when configured and executed, cause the at least one processor to collect the telemetry data, and responsive to the amount of resources allocated to the orchestrator meeting a second threshold, transmit the telemetry data associated with the orchestrator to a computer to obtain a third orchestration result at the second granularity.

Example 17 includes the non-transitory computer readable storage medium of example 16, wherein the second threshold is lower than the first threshold.

Example 18 includes the non-transitory computer readable storage medium of example 12, wherein the amount of resources is a first amount of resources, and wherein the instructions, when configured and executed, cause the at least one processor to responsive to the first amount of resources allocated to the orchestrator not meeting the first threshold, estimate a second amount of resources to allocate to the orchestrator, and scale the first amount of resources allocated to the orchestrator to meet the second amount of resources, wherein the second amount of resources corresponds to an amount of resources to meet performance indicators associated with the workload.

Example 19 includes the non-transitory computer readable storage medium of example 12, wherein the instructions, when configured and executed, cause the at least one processor to scale the amount of resources allocated to the orchestrator based on a priority level associated with ones of the resources.

Example 20 includes the non-transitory computer readable storage medium of example 12, wherein the amount of resources allocated to the orchestrator meets the first threshold when the amount of resources is less than or equal to the first threshold.

Example 21 includes the non-transitory computer readable storage medium of example 12, wherein the instructions, when configured and executed, cause the at least one processor to monitor a temperature of the edge platform.

Example 22 includes the non-transitory computer readable storage medium of example 21, wherein the instructions, when configured and executed, cause the at least one processor to responsive to the temperature of the edge platform exceeding a threshold temperature increase cooling at the edge platform, and reduce computation conditions of resources at the edge platform.

Example 23 includes an apparatus to control processing of telemetry data at an edge platform, the apparatus comprising means for interfacing to, responsive to an amount of resources allocated to an orchestrator to orchestrate a workload at the edge platform meeting a first threshold, transmit telemetry data associated with the orchestrator to a computer to obtain a first orchestration result at a first granularity, means for managing resources to determine a second orchestration result at a second granularity to orchestrate the workload at the edge platform, the second granularity finer than the first granularity, and means for scheduling to schedule a workload assigned to the edge platform based on the second orchestration result.

Example 24 includes the apparatus of example 23, wherein the means for managing resources is configured to compare the amount of resources allocated to the orchestrator to configuration settings associated with the orchestrator, determine whether the amount of resources allocated to the orchestrator meets the first threshold, and responsive to the amount of resources allocated to the orchestrator meeting the first threshold, determine whether the amount of resources allocated to the orchestrator meets a second threshold.

Example 25 includes the apparatus of example 24, wherein the configuration settings identify an amount of resources that can be allocated to the orchestrator at a power level.

Example 26 includes the apparatus of example 24, wherein the configuration settings identify an amount of resources that can be allocated to the orchestrator at a thermal condition.

Example 27 includes the apparatus of example 23, wherein the means for interfacing is configured to collect the telemetry data, and responsive to the amount of resources allocated to the orchestrator meeting a second threshold, transmit the telemetry data associated with the orchestrator to a computer to obtain a third orchestration result at the second granularity.

Example 28 includes the apparatus of example 27, wherein the second threshold is lower than the first threshold.

Example 29 includes the apparatus of example 23, wherein the amount of resources is a first amount of resources, and the means for managing resources is configured to responsive to the first amount of resources allocated to the orchestrator not meeting the first threshold, estimate a second amount of resources to allocate to the orchestrator, and scale the first amount of resources allocated to the orchestrator to meet the second amount of resources, wherein the second amount of resources corresponds to an amount of resources to meet performance indicators associated with the workload.

Example 30 includes the apparatus of example 23, wherein the means for managing resources is configured to scale the amount of resources allocated to the orchestrator based on a priority level associated with ones of the resources.

Example 31 includes the apparatus of example 23, wherein the amount of resources allocated to the orchestrator meets the first threshold when the amount of resources is less than or equal to the first threshold.

Example 32 includes the apparatus of example 23, wherein the means for interfacing is configured to monitor a temperature of the edge platform.

Example 33 includes the apparatus of example 32, further including means for controlling thermal conditions to, responsive to the temperature of the edge platform exceeding a threshold temperature increase cooling at the edge platform, and reduce computation conditions of resources at the edge platform.

Example 34 includes a method to control processing of telemetry data at an edge platform, the method comprising responsive to an amount of resources allocated to an orchestrator to orchestrate a workload at the edge platform meeting a first threshold, transmitting telemetry data associated with the orchestrator to a computer to obtain a first orchestration result at a first granularity, determining a second orchestration result at a second granularity to orchestrate the workload at the edge platform, the second granularity finer than the first granularity, and scheduling a workload assigned to the edge platform based on the second orchestration result.

Example 35 includes the method of example 34, further including comparing the amount of resources allocated to the orchestrator to configuration settings associated with the orchestrator, determining whether the amount of resources allocated to the orchestrator meets the first threshold, and responsive to the amount of resources allocated to the orchestrator meeting the first threshold, determining whether the amount of resources allocated to the orchestrator meets a second threshold.

Example 36 includes the method of example 35, wherein the configuration settings identify an amount of resources that can be allocated to the orchestrator at a power level.

Example 37 includes the method of example 35, wherein the configuration settings identify an amount of resources that can be allocated to the orchestrator at a thermal condition.

Example 38 includes the method of example 34, further including collecting the telemetry data, and responsive to the amount of resources allocated to the orchestrator meeting a second threshold, transmitting the telemetry data associated with the orchestrator to a computer to obtain a third orchestration result at the second granularity.

Example 39 includes the method of example 38, wherein the second threshold is lower than the first threshold.

Example 40 includes the method of example 34, wherein the amount of resources is a first amount of resources, and the method further including responsive to the first amount of resources allocated to the orchestrator not meeting the first threshold, estimating a second amount of resources to allocate to the orchestrator, and scaling the first amount of resources allocated to the orchestrator to meet the second amount of resources, wherein the second amount of resources corresponds to an amount of resources to meet performance indicators associated with the workload.

Example 41 includes the method of example 34, further including scaling the amount of resources allocated to the orchestrator based on a priority level associated with ones of the resources.

Example 42 includes the method of example 34, wherein the amount of resources allocated to the orchestrator meets the first threshold when the amount of resources is less than or equal to the first threshold.

Example 43 includes the method of example 34, further including monitoring a temperature of the edge platform.

Example 44 includes the method of example 43, further including responsive to the temperature of the edge platform exceeding a threshold temperature increasing active cooling at the edge platform, and reducing computation conditions of resources at the edge platform.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A platform for a first tier of a network, the platform comprising:
   memory;
   computer executable instructions; and
   processor circuitry to execute the computer executable instructions to at least:
      generate a first orchestration result at a first granularity, the first orchestration result for a first micro-service of a remote edge platform and a second micro-service of the remote edge platform, the remote edge platform in a second tier of the network that is closer to user equipment than the first tier, the first micro-service and the second micro-service associated with telemetry data from the remote edge platform;
      after determining the first granularity does not satisfy a level of granularity of orchestration results requested by the remote edge platform, generate a second orchestration result at a second granularity finer than the first granularity, the second orchestration result to orchestrate the first micro-service and the second micro-service, the level of granularity based on current or predicted usage of the remote edge platform;
      determine a schedule for the remote edge platform to execute the first micro-service and the second micro-service based on the second orchestration result; and
      cause transmission of the second orchestration result and the schedule to the remote edge platform.

2. The platform of claim 1, wherein the processor circuitry is to cause transmission of the first orchestration result to the remote edge platform.

3. The platform of claim 1, wherein the processor circuitry is to generate the first orchestration result based on a roofline model, the first orchestration result indicative of (1) a first amount of resources of the remote edge platform to allocate to the first micro-service to satisfy a first service level agreement (SLA) of the first micro-service and (2) a second amount of resources of the remote edge platform to allocate to the second micro-service to satisfy a second SLA of the second micro-service.

4. The platform of claim 1, wherein the processor circuitry is to generate the second orchestration result by:
   simulating different amounts of resources of the remote edge platform to allocate to the first micro-service and the second micro-service;
   selecting a first amount of resources of the remote edge platform to allocate to the first micro-service to satisfy a first service quality objective of a first service level agreement (SLA) of the first micro-service; and
   selecting a second amount of resources of the remote edge platform to allocate to the second micro-service to satisfy a second service quality objective of a second SLA of the second micro-service.

5. The platform of claim 1, wherein the processor circuitry is to determine the level of the granularity of the orchestration results requested by the remote edge platform based on an indication of the level of the granularity included with the telemetry data from the remote edge platform.

6. The platform of claim 5, wherein the level of the granularity corresponds to at least one of: how often the processor circuitry is to process the telemetry data or a complexity with which the processor circuitry is to orchestrate the first micro-service and the second micro-service.

7. The platform of claim 1, further including at least one of (1) a first power supply that is more stable than a second power supply of the remote edge platform or (2) first computational resources that outperform second computational resources of the remote edge platform.

8. The platform of claim 1, wherein the processor circuitry is to:
- decrypt a communication from the remote edge platform to determine the telemetry data; and
- encrypt the second orchestration result and the schedule prior to transmission to the remote edge platform.

9. A non-transitory computer readable storage medium comprising data configurable into executable instructions to cause processor circuitry of a platform for a first tier of a network to at least:
- generate a first orchestration result at a first granularity, the first orchestration result to orchestrate a first micro-service of a remote edge platform and a second micro-service of the remote edge platform, the remote edge platform in a second tier of the network, the second tier more proximate to an endpoint device than the first tier, the first micro-service and the second micro-service associated with telemetry data from the remote edge platform;
- determine the first granularity does not satisfy a granularity of orchestration results requested by the remote edge platform, the granularity of the orchestration results based on current or predicted usage of the remote edge platform;
- generate second orchestration result at a second granularity finer than the first granularity, the second orchestration result to orchestrate the first micro-service and the second micro-service;
- determine a schedule for the remote edge platform to execute the first micro-service and the second micro-service, the schedule based on the second orchestration result; and
- cause transmission of the second orchestration result and the schedule to the remote edge platform.

10. The non-transitory computer readable storage medium of claim 9, wherein the instructions cause the processor circuitry to cause transmission of the first orchestration result to the remote edge platform.

11. The non-transitory computer readable storage medium of claim 9, wherein the instructions cause the processor circuitry to generate the first orchestration result based on a roofline model, the first orchestration result indicative of (1) a first amount of resources of the remote edge platform to be allocated to execute the first micro-service to satisfy a first service level agreement (SLA) of the first micro-service, and (2) a second amount of resources of the remote edge platform to be allocated to execute the second micro-service to satisfy a second SLA of the second micro-service.

12. The non-transitory computer readable storage medium of claim 9, wherein the instructions cause the processor circuitry to generate the second orchestration result by:
- simulating different amounts of resources of the remote edge platform to be allocated to execute the first micro-service and the second micro-service;
- selecting a first amount of resources of the remote edge platform to be allocated to execute the first micro-service to satisfy a first service quality objective of a first service level agreement (SLA) of the first micro-service; and
- selecting a second amount of resources of the remote edge platform to be allocated to execute the second micro-service to satisfy a second service quality objective of a second SLA of the second micro-service.

13. The non-transitory computer readable storage medium of claim 9, wherein the instructions cause the processor circuitry to determine the granularity of orchestration results requested by the remote edge platform based on an indication of granularity included with the telemetry data from the remote edge platform.

14. The non-transitory computer readable storage medium of claim 9, wherein the instructions cause the processor circuitry to:
- decrypt a first communication from the remote edge platform to determine the telemetry data; and
- encrypt a second communication including the second orchestration result and the schedule prior to transmission to the remote edge platform.

15. A platform for a first tier of a network, the platform comprising:
- means for managing resources to generate a first orchestration result at a first granularity, the first orchestration result corresponding to a first micro-service of a remote edge platform and a second micro-service of the remote edge platform, the remote edge platform in a second tier of the network that is closer to an endpoint device than the first tier, the first micro-service, the first micro-service and the second micro-service associated with telemetry data from the remote edge platform;
- means for interfacing to determine the first granularity does not satisfy a granularity of orchestration results requested by the remote edge platform, the granularity of the orchestration results based on current or predicted usage of the remote edge platform;
- the resource managing means to generate second orchestration result at a second granularity finer than the first granularity, the second orchestration result to orchestrate the first micro-service and the second micro-service; and
- means for scheduling to determine a schedule to execute the first micro-service and the second micro-service at the remote edge platform, the schedule based on the second orchestration result;
- the interfacing means to cause transmission of the second orchestration result and the schedule to the remote edge platform.

16. The platform of claim 15, wherein the interfacing means is to cause transmission of the first orchestration result to the remote edge platform.

17. The platform of claim 15, wherein the resource managing means is to generate the first orchestration result based on a roofline model, the first orchestration result indicative of (1) a first amount of resources that the remote edge platform is to allocate to the first micro-service to satisfy a first service level agreement (SLA) of the first micro-service and (2) a second amount of resources that the remote edge platform is to allocate to the second micro-service to satisfy a second SLA of the second micro-service.

18. The platform of claim 15, wherein the resource managing means is to generate the second orchestration result by:
- simulating different amounts of resources that the remote edge platform is to allocate to the first micro-service and the second micro-service;
- selecting a first amount of resources that the remote edge platform is to allocate to the first micro-service, the first amount of resources to satisfy a first service quality objective of a first service level agreement (SLA) of the first micro-service; and
- selecting a second amount of resources that the remote edge platform is to allocate to the second micro-service, the second amount of resources to satisfy a second service quality objective of a second SLA of the second micro-service.

19. The platform of claim 15, further including at least one of (1) a first power supply that is more stable than a second power supply of the remote edge platform or (2) first computational resources that outperform second computational resources of the remote edge platform.

20. The platform of claim 15, wherein the interfacing means is to:
- decrypt a first communication from the remote edge platform to determine the telemetry data; and
- encrypt a second communication prior to transmission of the second communication to the remote edge platform, the second communication including the second orchestration result and the schedule.

* * * * *